(12) United States Patent
Luo et al.

(10) Patent No.: US 12,498,515 B2
(45) Date of Patent: Dec. 16, 2025

(54) MULTI-CORE FIBER, METHODS OF MAKING AND USE THEREOF

(71) Applicant: Pavilion Integration Corporation, San Jose, CA (US)

(72) Inventors: Ningyi Luo, San Jose, CA (US); Jihchuang Robin Huang, San Jose, CA (US)

(73) Assignee: Pavilion Integration Corporation, San Jose, CA (US)

( * ) Notice: Subject to any disclaimer, the term of this patent is extended or adjusted under 35 U.S.C. 154(b) by 323 days.

(21) Appl. No.: 18/020,409

(22) PCT Filed: Aug. 6, 2021

(86) PCT No.: PCT/US2021/045046
§ 371 (c)(1),
(2) Date: Feb. 8, 2023

(87) PCT Pub. No.: WO2022/035707
PCT Pub. Date: Feb. 17, 2022

(65) Prior Publication Data
US 2023/0288630 A1 Sep. 14, 2023

Related U.S. Application Data

(60) Provisional application No. 63/063,264, filed on Aug. 8, 2020.

(51) Int. Cl.
*G02B 6/02* (2006.01)
(52) U.S. Cl.
CPC .............................. *G02B 6/02042* (2013.01)

(58) Field of Classification Search
None
See application file for complete search history.

(56) References Cited

U.S. PATENT DOCUMENTS 10,288,815 B2 5/2019 Liermann et al.
2005/0122580 A1 6/2005 Birk et al.
(Continued)

FOREIGN PATENT DOCUMENTS

WO    WO/2019/224146 A1    11/2019

OTHER PUBLICATIONS

International Search Report and Written Opinion of the International Searching Authority. International Application No. PCT/US21/45046 issued by the USPTO ISA/US, mail date Nov. 2, 2021, 19 pages, USPTO, Alexandria, VA.
(Continued)

*Primary Examiner* — Jerry Rahll
(74) *Attorney, Agent, or Firm* — Peter B Scull

(57) ABSTRACT

Arrangements of multi-core fibers, devices, and systems with two or more cores, defined by a core separation of less than a cross-sectional diameter of a discrete single core unmodified fiber, and methods of using are provided and/or described herein. Arrangements of fibers, devices, and systems with three or more cores, defined by a core separation of less than a cross-sectional diameter of a discrete single core fiber, and methods of using are provided and/or described herein. Also, disclosed are methods of manufacturing and joining two or more single rectangular (or square core) fibers to form two or more lines of illumination for myriad applications.

20 Claims, 20 Drawing Sheets

(56) References Cited

U.S. PATENT DOCUMENTS

| | | |
|---|---|---|
| 2006/0098934 A1 | 5/2006 | Eyal et al. |
| 2008/0004491 A1 | 1/2008 | Karasawa |
| 2011/0274435 A1 | 11/2011 | Fini et al. |
| 2015/0316715 A1 | 11/2015 | Fujikura |
| 2016/0278622 A1 | 9/2016 | Klubben, III et al. |
| 2016/0349447 A1* | 12/2016 | Butler .............. C03B 37/01222 |

OTHER PUBLICATIONS

Transmittal of International Preliminary Report on Patentability for Application No. PCT/US21/45046 issued by the International Bureau of WIPO, Geneva, Switzerland, date of mailing Feb. 23, 2023, 1 page, which includes the International Preliminary Report on Patentability, date of issuance Feb. 7, 2023, 1 page, with the Written Opinion of the International Searching Authority for International Application No. PCT/US21/45046 issued by the USPTO ISA/US, mail date Nov. 2, 2021, 10 pages, USPTO, Alexandria, VA.

* cited by examiner

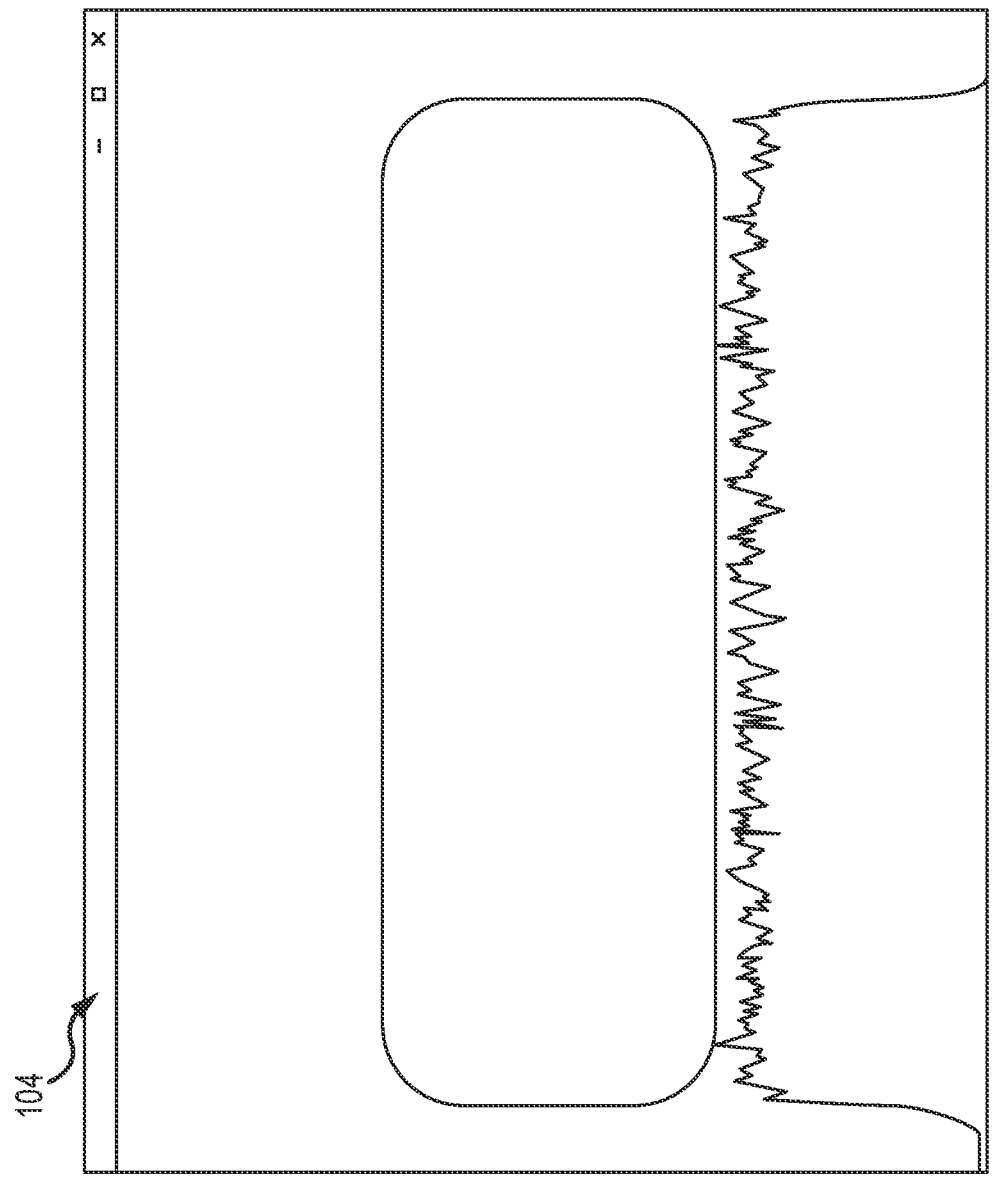

102 / 127a /127b / 227a /227b / 227c

MULTI-CORE FIBER, METHODS OF MAKING AND USE THEREOF

BACKGROUND

Advances in software, electronics, and materials science have led to numerous advanced scientific instruments that utilize and implement lasers to perform a variety of crucial operations. In particular, many of these advanced scientific instruments may employ fiber optics and lasers to image a sample to elucidate and uncover certain characteristics of the sample that are of interest to a scientific researcher or medical doctor. In some bio-related applications, illumination of a sample with a flattop beam profile utilizing two or more different wavelengths may be desirable. However, the common and currently implemented fiber manufacturing and drawing process does not allow for two rectangular cores to be drawn together in one fiber. Thus, current conventional techniques for manufacture and production of arrangements of fibers may be constrained to utilizing cores having circles, squares, or low aspect ratio rectangles; in some examples: up to only about 1:3.

Thus, further alternative fiber arrangements may allow for controlling the propagation and delivery of light sources via multi-core rectangular, and/or square, or hexagonal, or other shape fibers may be desirable. Such multi-core fibers may be integrated and utilized in myriad bioimaging instruments and metrology apparatuses. Moreover, methods of construction and manufacture of multi-core fiber arrangements may be useful.

SUMMARY

The present developments disclose an arrangement of multi-core fibers with rectangular, or square, or hexagon, or other shape, cross-section cores, frequently elongated shapes, the multi-core arrangement defined by a core separation of less than a cross-sectional diameter of a discrete single unmodified core fiber, and optics thereof. Moreover, the developments hereof disclose and describe the method of manufacturing and fabricating fibers and optics thereof using rectangular and/or square or other shaped cross-section cores, frequently elongated or oblong shapes. Two or more fibers having elongated shaped cores may be joined to form multi-core fibers, defined by a core separation of less than a cross-sectional diameter of a discrete single core fiber, the multi-core fibers providing or generating a plurality of lines of illumination, also referred to as multi-line illumination, that may be applied and utilized in several industries, including for example bioimaging and bio-applications.

Described herein are several alternative arrangements of fibers, specifically in some implementations optical fibers for e.g., fiber optics applications, that may be used to provide a flattop beam profile to illuminate one or more samples. For example, two or more fiber lines may be separated by a specific distance and two or more corresponding different wavelengths can enhance performance of an instrument, for example, in applications of flow cytometry, DNA sequencing, light-sheet microscopy, by simultaneously providing two or more wavelengths or colors of excitations to different samples, or to the same sample at nearby locations. In another example, three (or more) fiber lines may be separated by a specific distance and three (or more) different wavelengths may be used to enhance an instruments performance by simultaneously providing three (or more) wavelengths or colors of excitation to different samples, or to the same sample at nearby locations.

Thus, in accordance with one aspect, provided herein is an arrangement of two or more optical fibers, each optical fiber having a rectangular cross-sectional core, the rectangular cross-sectional cores being separated by a distance that is determined by application the fiber is used in; however, the distance may be less than the diameter of an unmodified fiber.

In accordance with another aspect, provided herein is an arrangement of three optical fibers, each optical fiber having a rectangular cross-sectional core, rectangular cross-sectional cores are separated by a distance that is determined in by the application the fiber is used in; however, the distance may be less than the diameter of an unmodified fiber.

In accordance with another aspect, herein provided is a method of forming a multi-core fiber including joining a section of two lengths of optical fibers to form multi-core fiber, the method further including: providing a first single core optical fiber having a top side and a bottom side; providing a second single core optical fiber having a top side and a bottom side; providing a fiber fixture; placing the bottom side of the first single core fiber on a fiber fixture, placing the bottom side of the second single core fiber on a fiber fixture, aligning the orientation of the first optical fiber and the second optical fiber, filling one or more support regions with a fixing agent, removing a portion of the top sides from the first and second single core optical fibers resulting in the first fiber and the second fibers having a flat top side area; aligning and permanently joining the first fiber and second fiber at the flat top side areas.

In accordance with another aspect, herein provided is a method of forming a multi-core fiber including: joining a section of three lengths of optical fibers to form a single tri core fiber, the method further including: providing a first single core optical fiber having a top side and a bottom side; providing a second single core optical fiber having a top side and a bottom side; providing a third single core optical fiber having a top side and a bottom side; providing a fiber fixture; placing the bottom side of the first single core fiber on a fiber fixture, placing the bottom side of the second single core fiber on a fiber fixture, aligning the orientation of the first optical fiber and the second optical fiber, filling one or more support regions with a fixing agent, removing a portion of the top sides from the first and second single core optical fibers resulting in the first fiber and the second fibers having a flat top side area; placing the bottom side of the third single core optical fiber on fiber fixture; removing a portion of the top side of the third fiber resulting in the third fiber having a flat top-side area; detaching the fiber from the fixture; placing the third fiber flat top area side down on a fixture; filling support regions with a fixing agent; removing a portion of the bottom side of the third fiber resulting in the third fiber having a flat top area and a flat bottom area; aligning and permanently joining the flat top area of the first fiber to the flat top area of the third fiber; aligning and permanently joining the flat top area of the second fiber to the flat bottom area of the third fiber.

BRIEF DESCRIPTION OF DRAWINGS

For a detailed description of exemplary implementations of the developments, reference will now be made to the accompanying drawings in which:

FIGS. 1A and 1B provide a gaussian profile laser light in FIG. 1A going through a rectangular fiber and producing a uniform intensity output in FIG. 1B.

DETAILED DESCRIPTION

Figure 1A:
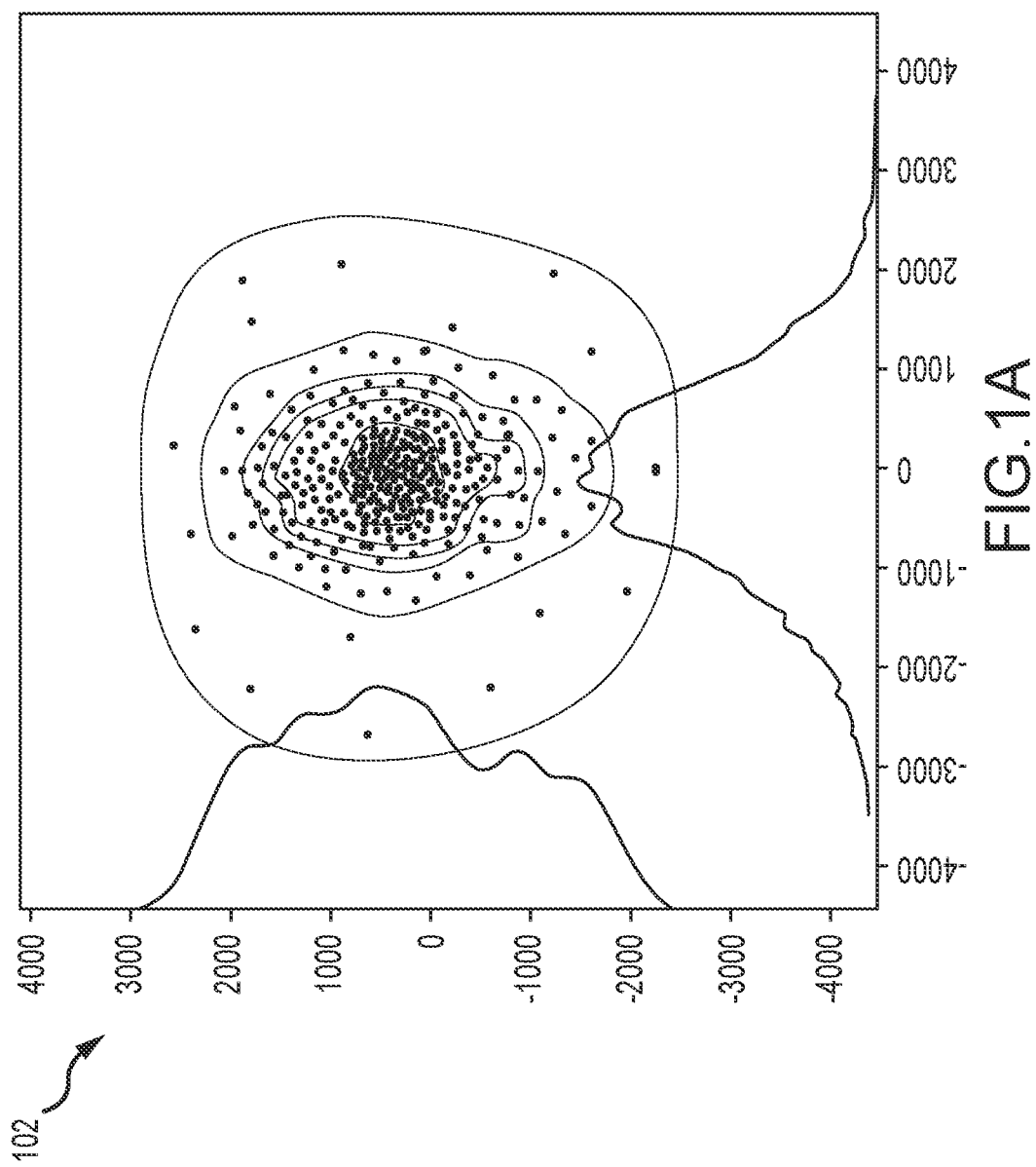

While the developments hereof are amenable to various modifications and alternative forms, specifics hereof have been shown herein by way of non-limitative examples in the drawings and the following description. It should be understood, however, that this is not to limit the inventions hereof to the particular embodiments described. This is instead to cover all modifications, equivalents, and alternatives falling within the spirit and scope of the developments whether described here or otherwise being sufficiently appreciable as included herewithin even if beyond the literal words or figures hereof.

The following discussion is directed to various implementations of the developments hereof. Although one or more of these implementations may be preferred, the implementations disclosed should not be interpreted, or otherwise used, as or for limiting the scope of the disclosure, including the claims. In addition, one skilled in the art will understand that the following description has broad applications, and the discussion of any implementation is only exemplary of that implementation and is not to intimate that the scope of the disclosure, including the claims, is limited to that implementation.

In general, included here are arrangements of multiple-core fibers that may be for rectangular, or square or hexagon or other shaped cores, regular or irregular, symmetric or asymmetric, and particularly in many implementations optical fibers and methods of making these arrangements. The developments hereof combine two or more initially separate, initially single core fibers to deliver a closely packed dual-line (or multi-line) light source with good uniformity. One feature of these arrangements may be that the center-to-center spacing of the fiber cores, that is, the distance between the center of the fiber cores, is less than the diameter of a single unmodified fiber. As used herein, a fiber has a core and one or more claddings, or layers of cladding. The fiber core can be made from drawn glass/silica or certain plastics. The cladding of one or more layers of materials, is a material of lower refractivity that is in direct contact with the core that causes the light to be confined to the core of the fiber. In one implementation, two rectangular core fibers may be aligned and used to deliver a dual-line light source that in some implementations will be a uniform dual-line light source. Another aspect of the developments hereof is delivering the output from a fiber hereof to a target location with modifications such as stretching and/or shrinking to the beams to deliver a desired illumination.

A dual-core in a single fiber produces two uniform basic line shapes. Using fiber to deliver illumination may provide the benefit of converting a non-uniform laser intensity, such as gaussian 102 or bell shape profiles, into a well-defined output that takes the shape of the core fiber, yet provides good uniformity. For example, FIG. 1A provides gaussian profile laser beam 102 that is coupled and goes through a rectangular fiber and produces the rectangular-shaped uniform output 104 of FIG. 1B. The uniformly intense output shown in FIG. 1B, includes a small variation (Imax−Imin/Imax+Imin) that is equal or approximately equal to about 7%, where Imax is the highest intensity inside the region of measurement and Imin is the lowest intensity. More than 80% of the total power is available for the application when the variation requirement is better than 10%. Comparing to a perfect Gaussian beam, only approximately 18% of the power is useable when the instrument allows for 10% of intensity uniformity.

Figure 2:
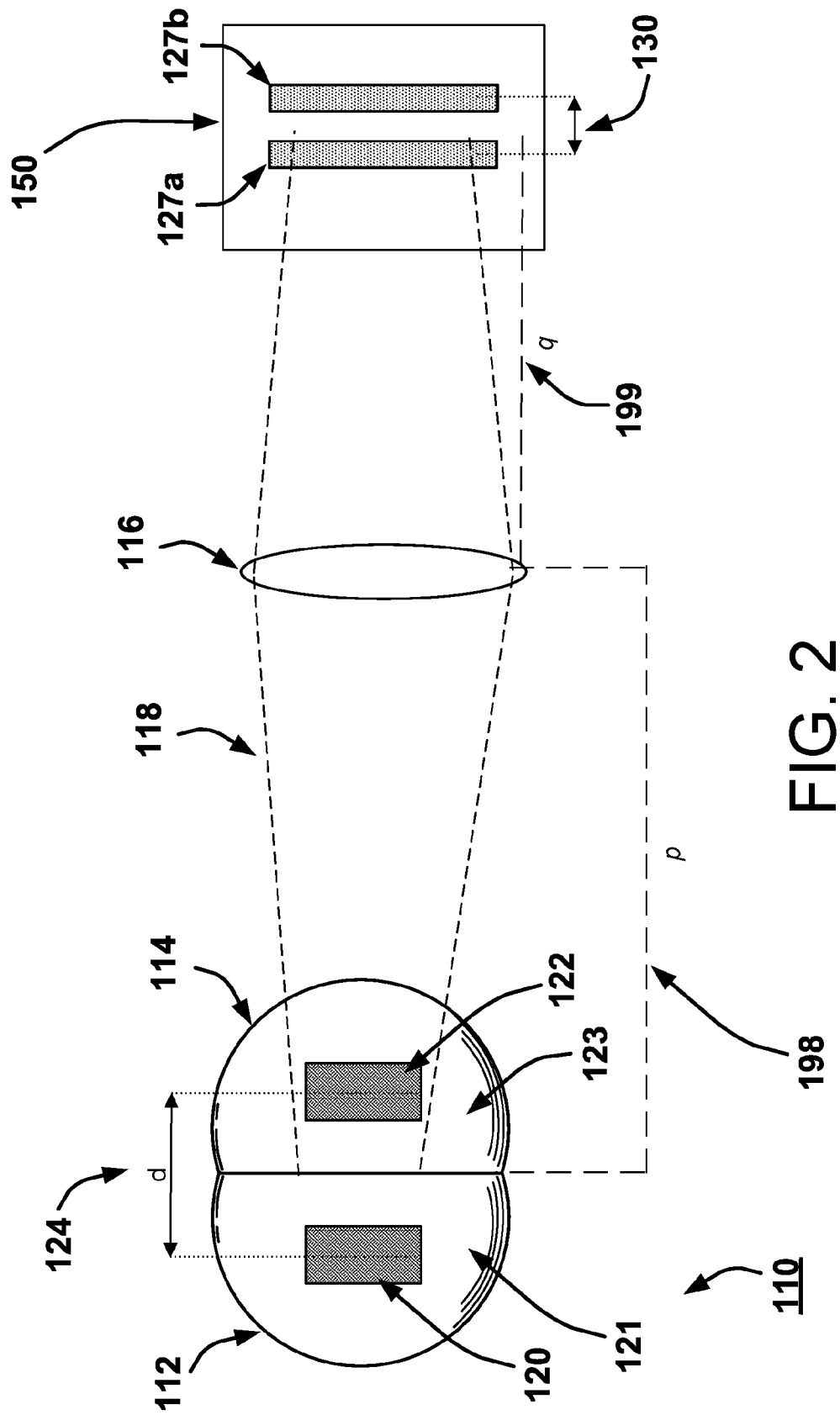
FIG. 2 is a schematic diagram of an arrangement of a multi-core fiber with two cores, here, optical fiber cores, imaging optics, and the output thereof.

In one aspect, as shown in FIG. 2, for example, an arrangement of fibers 110 hereof may include arranging and aligning two fibers 112, 114 and providing imaging optics 116 after the fibers to provide an output 118, as shown in FIG. 2. Fiber 112 has a core 120 surrounded by cladding 121; and fiber 114 has a core 122 surrounded by cladding 123. The center of core 120 is separated from the center of the core 122 by the distance (d) 124. The claddings 121, 123 between the two rectangular cores 120, 122 ensure that about less than 5% of the light sent through the cores 120, 122 is lost to leakage.

Providing imaging optics 116 to the arrangement of fibers 110, allows the closely packed multi-core fiber arrangement to produce multi light lines and/or laser lines 127a, 127b with uniformity and high aspect ratios, on an image plane 150. The aspect ratio is the ratio of the short side to the long side of laser line 127a, 127b. In some implementations the imaging optics 116 can be used to form uniform laser lines 127a, 127b that have aspect ratios of 1:3, 1:4, 1:5, 1:6, 1:7, 1:8, 1:9, 1:10, and in some instances greater than 1:10. The aspect ratios are not to be limited to integers, as the aspect ratio may be any two numbers, including decimals and/or fractions, that may be useful in at particular application. The preferred, desired, and/or appropriate aspect ratio for a particular application may depend on a number of factors, including different cross-sectional shapes of the cores, circular, elliptical or quasi-elliptical, polygonal, regular or irregular, symmetric or asymmetric. The imaging optics 116 may be easily changed to achieve the desired line shapes and aspect ratios.

The line spacings 130, that is the distance or spacing between laser line 127a and laser line 127b measured from their respective centers may also be modified and tuned for a specific application, as the specifications and preferences may be different between different applications. Again, the preferred, desired, and/or appropriate line spacing 130 for a particular application may depend on several factors. Thus, one aspect of the current developments is the ability to change or modify the length of the center-to-center spacing between laser line 127a and laser line 127b, and the developments hereof provide for the line spacings 130 to be as narrow as for an example about 50 μm from the center of laser line 127a to the center of laser line 127b, to as wide as for another example about 300 μm from the center of laser line 127a to the center of laser line 127b.

The imaging optics 116 may contain preset settings that provide for and allow a user to adjust the line spacing 130 with relative ease, that is tuning of dials or settings to preset positions that would adjust the imaging optics 116 and thus adjust the laser line spacing 130. In this way the line spacings 130 may be relatively easily adjust via the imaging optics 116 and preset/predetermined line spacing distances may be provided. Thus, the line spacings may be as close as single line width, in some examples about: 50 μm center to center, 55 μm center to center, 60 μm center to center, 65 μm center to center, 70 μm center to center, 75 μm center to center, 80 μm center to center, 85 μm center to center, 90 μm center to center, 95 μm center to center, 100 μm μm center to center, 125 μm center to center, 150 μm center to center, 175 μm center to center, 200 μm center to center, 225 μm center to center, 250 μm center to center, 275 μm center to center, 300 μm center to center, or more than about 300 μm center to center. Thus, the line spacings may be as close as about 50 μm center to center or more than about 300 μm center to center, or any distance between about 50 μm center to center and about 300 μm center to center.

In one aspect, the developments hereof may include a method of producing two or more lines of illumination on an image plane comprising: providing one or more light sources; coupling and/or cooperatively connecting a fiber having one or more cores to the light source; and generating an output of two or more lines of illumination. In some implementations, the method may include using lasers as a light source, resulting in the production of laser lines on an image plane. In other methods, the light source may be selected from other light sources described and disclosed in FIGS. 5A, 5B, 8A and 8B, inter alia. In some implementations, the method hereof may include providing imaging optics for independently transforming the length or width of the output of one or more lines of illumination. In some implementations, the imaging optics magnify and/reduce the optical distortion of the output. In some implementations, the fibers may modified so that the center-to-center distance of the cores of the fibers are less than the diameter of the core of one fiber.

Figure 4A:
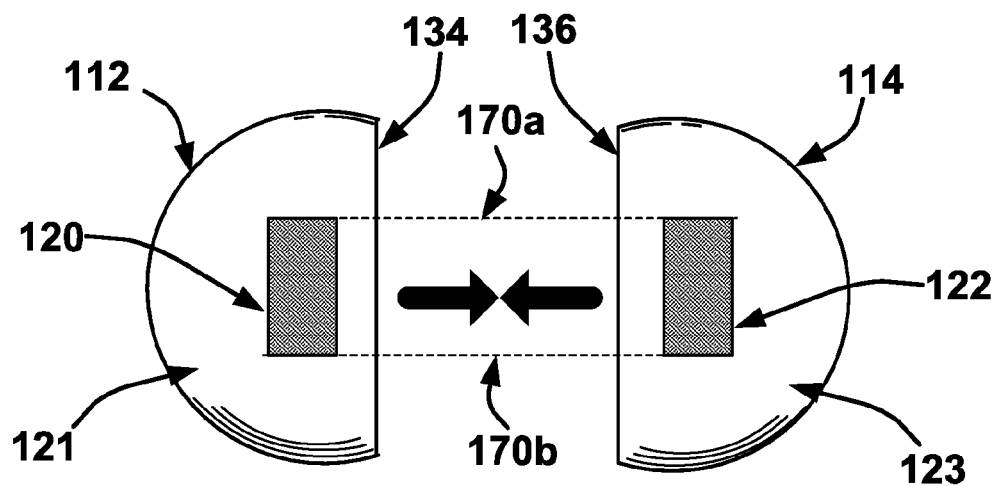
FIGS. 4A and 4B provide cross-sectional views of an arrangement of fibers hereof.
Figure 4B:
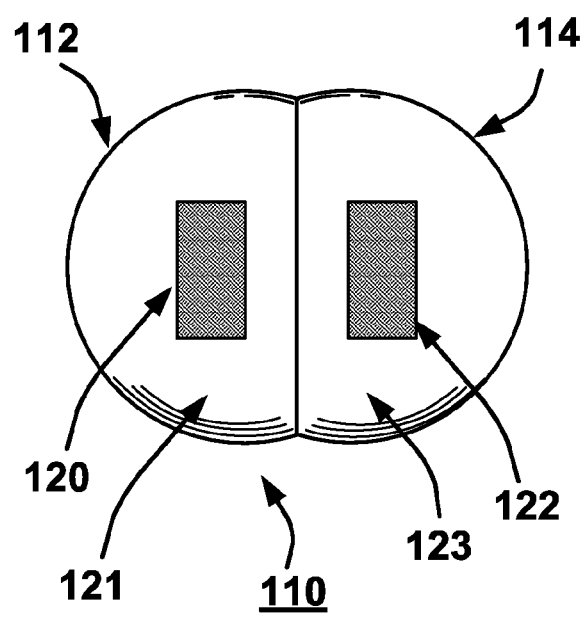
Figure 15A:
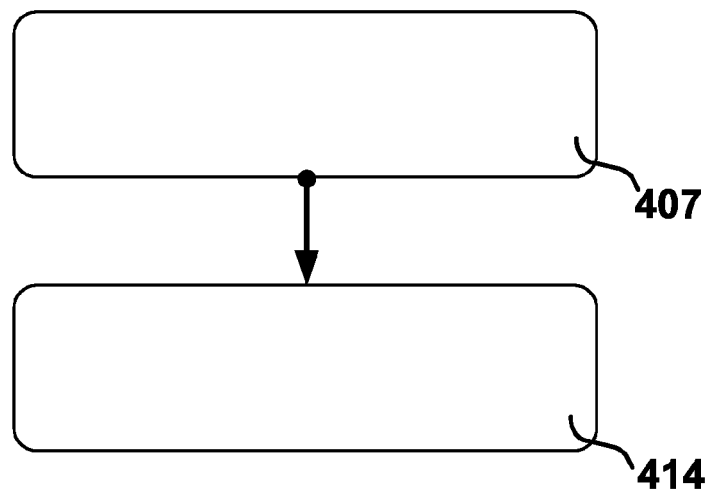
FIGS. 15A, 15B, and 15C provide flow charts showing methods for forming a two-core fiber.

A fiber arrangement having two rectangular cores may be made by attaching two relatively D-shaped fibers along their flat sides. A method hereof thus may be summarized in one view, as shown in FIG. 15A, as firstly forming or shaping of one or more fibers 407 for a joining operation and then secondly joining 414 two or more fibers, to form a multi-core fiber with core separation of less than a diameter of a single un-modified fiber. FIG. 4A provides a cross-sectional view of two D-shaped fibers 112, 114 before they have been joined together and/or as in the process of the joining; with FIG. 4B showing the two fibers in the completing of the joining and/or as joined position. The fibers 112, 114 shown here have rectangular shaped cores 120, 122 and cladding 121, 123 surrounds the cores. Fibers 112, 114 also each have flat sides 134, 136 that allows the two D-Shaped fibers to be joined together.

A D-shaped fiber may be initially drawn or manufactured or formed or shaped in the D-shape from at the outset. The flat side 134 of a D-shaped fiber 112 could then by matched, aligned, and affixed to the flat side 136 of another fiber (of any shape), but here shown as another D-shaped fiber 114 to form an arrangement 110 as shown in FIG. 4B. A fiber may otherwise not commonly be initially formed or mass-produced as a D-shaped fiber; however, it may be possible to make a D-shaped fiber having a rectangular core with proper tooling, materials, design, and setup in the fiber drawing process. However, an alternative way to fabricate an arrangement of optical having two rectangular or square or other non-previously standard shaped cores, is to modify or alter the cladding layer of one or more commercially available circular shaped fibers, by removing a portion of the cladding material on two fibers and then bonding the resulting D-shaped fibers together to form a single fiber with multiple cores.

Figure 3A:
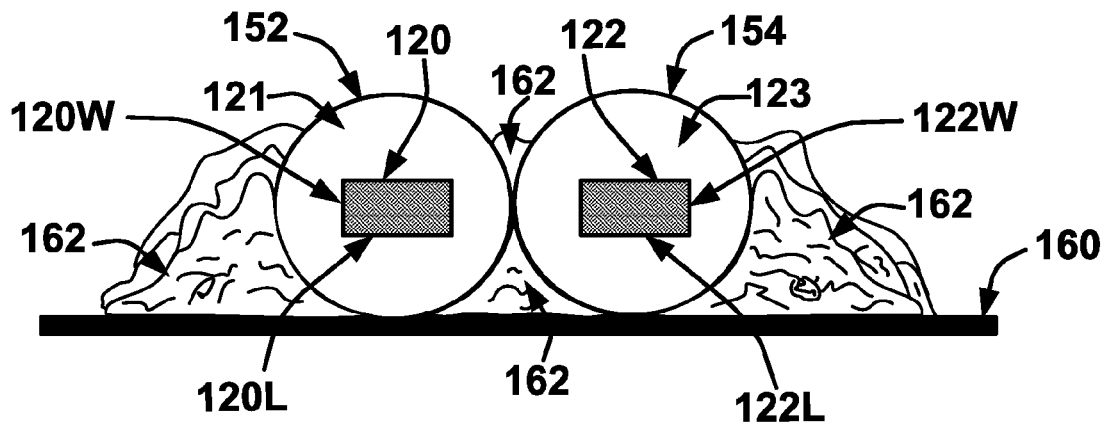
FIGS. 3A, 3B, and 3C, provide cross-sectional diagrams of two single core fibers affixed to a fixture prior to and after removing part of the cladding.

Two fibers having circular shaped cladding are provided and altered in a controlled manner to remove a portion of the cladding to create two D-shaped fibers that can be joined along their respective flat sides, as described above. The operations of an exemplar method of creating two D-shaped fibers is shown and described in FIGS. 3A to 3C.

First, two circular cladded fibers 152, 154 that have rectangular cores 120, 122 are placed on a fiber fixture 160. These fibers may vary in length, but more typically, the area to be altered/modified for bonding will range from approximately 10 mm to 300 mm in length. The fibers 152, 154 may be much longer than the section of the fiber that will be altered and then bonded together. The extra length of fiber can be separated and stay in the original form as a relatively circular cladded fiber.

It should be noted that the cores 120, 122 are oriented and arranged such that the longer side of the core (the length or height) 120L, 122L runs parallel to the fiber fixture 160. This may be used to ensure that the proper/desired orientation will be provided for the combined arrangement of the two D-shaped fibers and helps to ensure that cores 120, 122 are not damaged as the cladding is altered and removed. Moreover, the shorter sides of the core (the width) 120W, 122W should be oriented to generally run perpendicular to the fiber fixture 160. Properly aligning the core 120, 122 to each other and to the fiber fixture may include adjusting the fibers such that they are both level and square to the fiber fixture 160 and to each other.

Figure 3B:
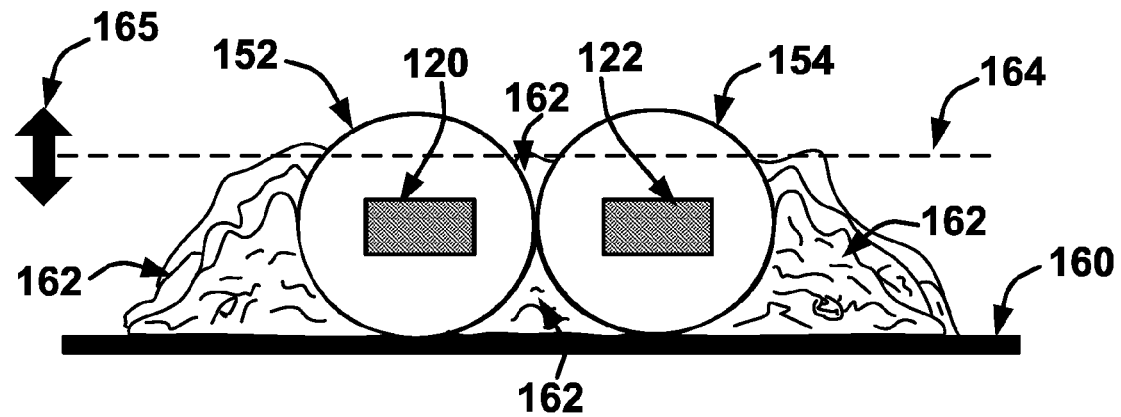

Next, the fibers are secured in place on the fiber fixture 160 with wax or non-permanent epoxy 162. The wax or non-permanent epoxy 162 may be placed around the bottom half of the circular cladded fibers 152, 154 and used to securely affix the properly aligned circular cladded fibers 152, 154 to the fiber fixture 160. Once, the wax or non-permanent epoxy 162 has sufficiently cured and/or hardened, a portion of the circular cladding can be removed as shown in FIG. 3B from the circular cladded fibers 152, 154. The cladding may be removed by one or more of several processes, including but not limited to, grinding, polishing, and/or etching. Dashed line 164 demonstrates the desired thickness of the cladding 121, 123 that will be removed through the grinding, polishing, or etching process(es).

Figure 3C:
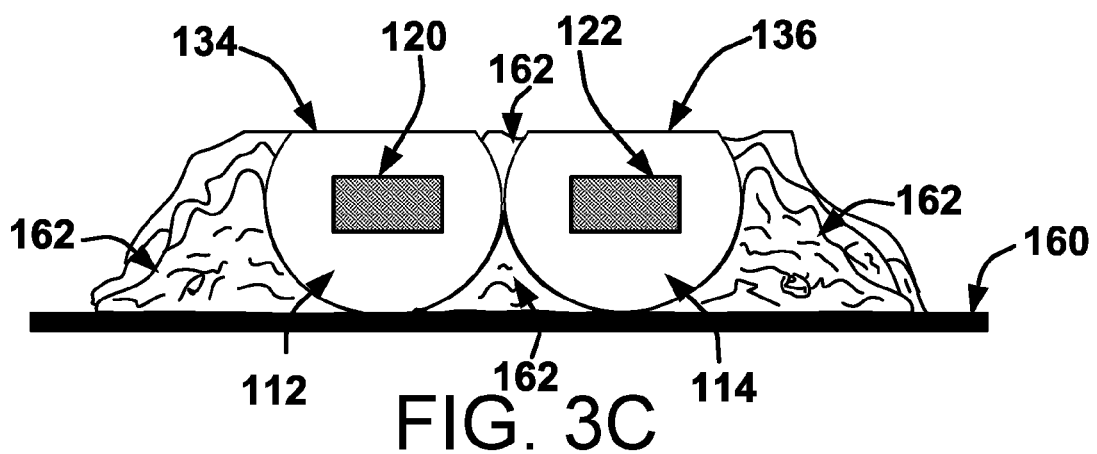

Double-headed arrow 165 is included in FIG. 3B to show that the dashed line may be moved up or down as may be desired for different applications, as this will control the amount of cladding removed, or that remains and thus control the distance between cores of the fiber in the final arrangement. FIG. 3C shows a cross-sectional view of the resulting D-shaped optical fibers 112, 114 that are can be assembled to form the arrangement of fibers 110 that is shown in FIG. 2 and FIG. 4B. Note, that once that cladding is removed through the grinding, polishing, or etching processes, flat sides 134, 136 are left remaining which can be used to form a two fiber arrangement 110 described and shown in FIGS. 2, 4B, 5A, and 5B, inter alia. Note, it may be only one of the plurality of fibers is shaped in this way and it may alternatively be that a non-flat line shape of the cladding shaping/removal may be made—as for example a concave circular or elliptical shape on one fiber might be made to fit against the convex outer circular form of an un-modified second fiber. Grinding, etching, polishing or the like might make such a shaping sub-process more readily available in some implementations.

The two D-shaped fibers 112, 114 are joined together on their respective flat sides 134, 136 by applying epoxy to the flat sides 134, 136 and/or by fusing the cladding. In the process of joining D-shaped fiber 112 to D-shaped fiber 114, the cores 120 and 122 may preferably be aligned and squared in relation to each other as demonstrated by dashed lines 170a, 170b. The result of joining the two D-shaped fibers is shown in the fiber arrangement in FIG. 4B. One or more clamps or vises may be used to hold the D-shaped fibers 112, 114 in contact with each other while the epoxy cures or as the claddings are fused together to secure the fibers in their final form.

Figure 5A:
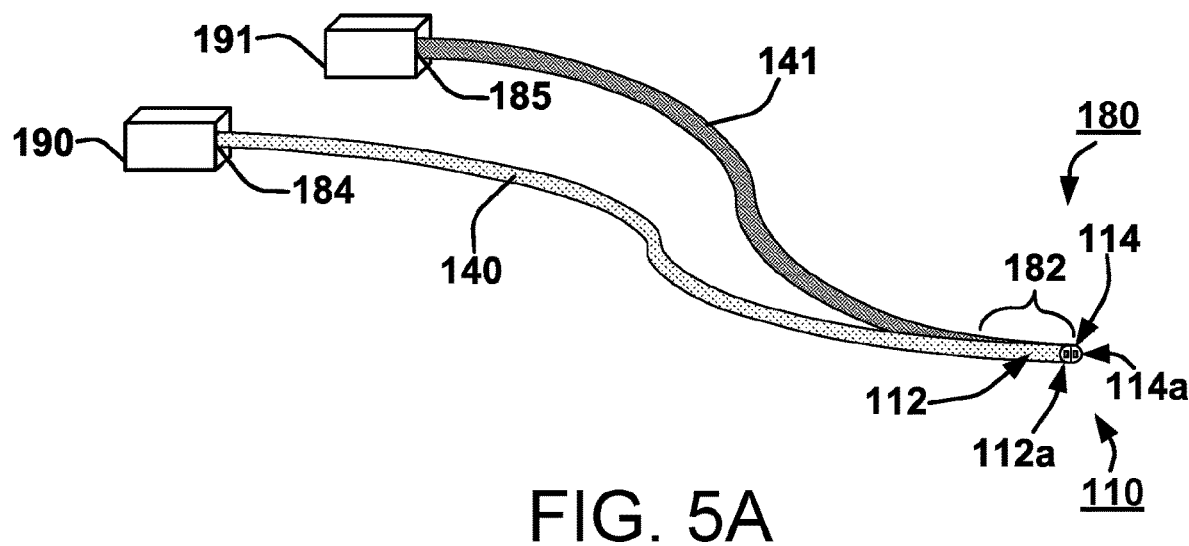
FIGS. 5A and 5B provide schematic diagrams of an arrangement of fibers hereof.
Figure 5B:
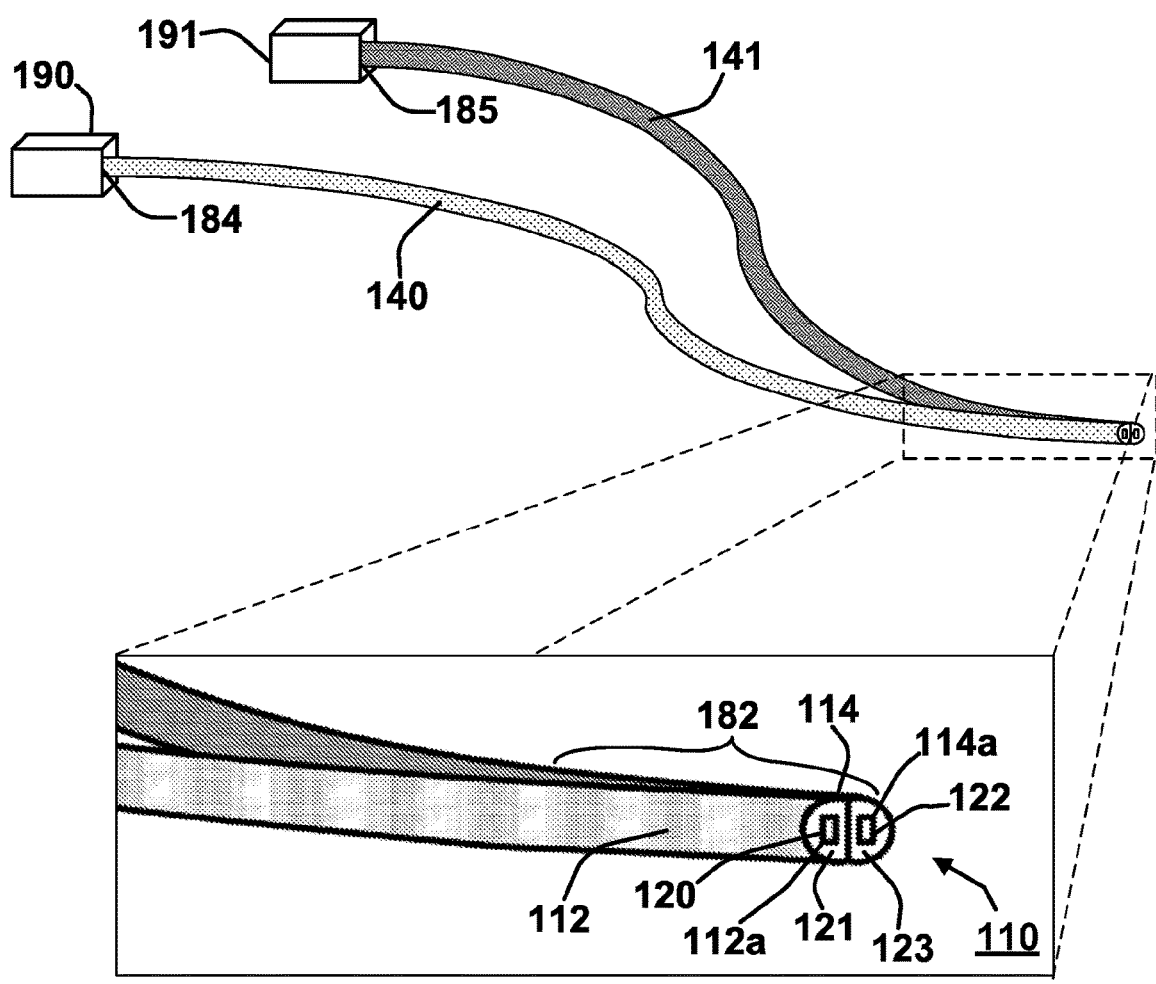

FIGS. 5A and 5B provide a schematic diagram of a finished fiber that has a joined end 180 to form the arrangement of fibers 110. The overall length of the fibers 140, 141 may range from about 30 mm to about 10 m or even more. The length of joined section 182 may range from about 10 mm to about 300 mm depending on the specifications that may implemented for a particular application. FIG. 5A also provides light source(s) 190, 191 that are cooperatively connected to the input ends 184, 185. FIG. 5A also demonstrates how the fibers 140, 141 are joined at the joined end 180, where the D-shaped fibers 112, 114 form an arrangement 110, that are also the output ends 112a, 114a of the cores. FIG. 5B provides an enlarged version of the joined end 180 and shows the arrangement of fibers 110 that includes the D-shaped fibers 112, 114 joined along their respective flat sides. Additionally, FIG. 5B shows how the rectangular shaped cores 120, 122 are surrounded by cladding 121, 123 to form the arrangement of fibers 110 that is capable of being connected to a laser light source 190, 191, at the input ends 184, 185. Again, the fibers 140, 141 are cooperatively connected to the light sources 190, 191 at their respective input ends 184, 185 and are joined at their respective output ends 112a, 114a. The output ends 112a, 114a may be coupled with imaging optics to produce the desired laser line outputs for specific applications.

Figure 7A:
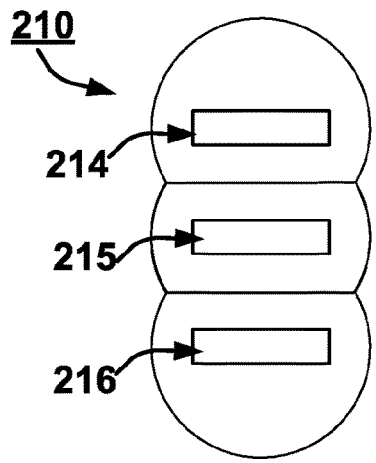
FIGS. 7A, 7B and 7C provide cross-sectional views of an exemplar arrangement of fibers hereof.
Figure 7B:
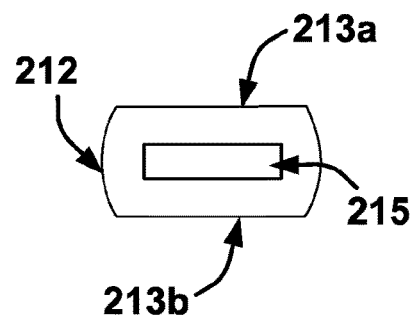
Figure 9:
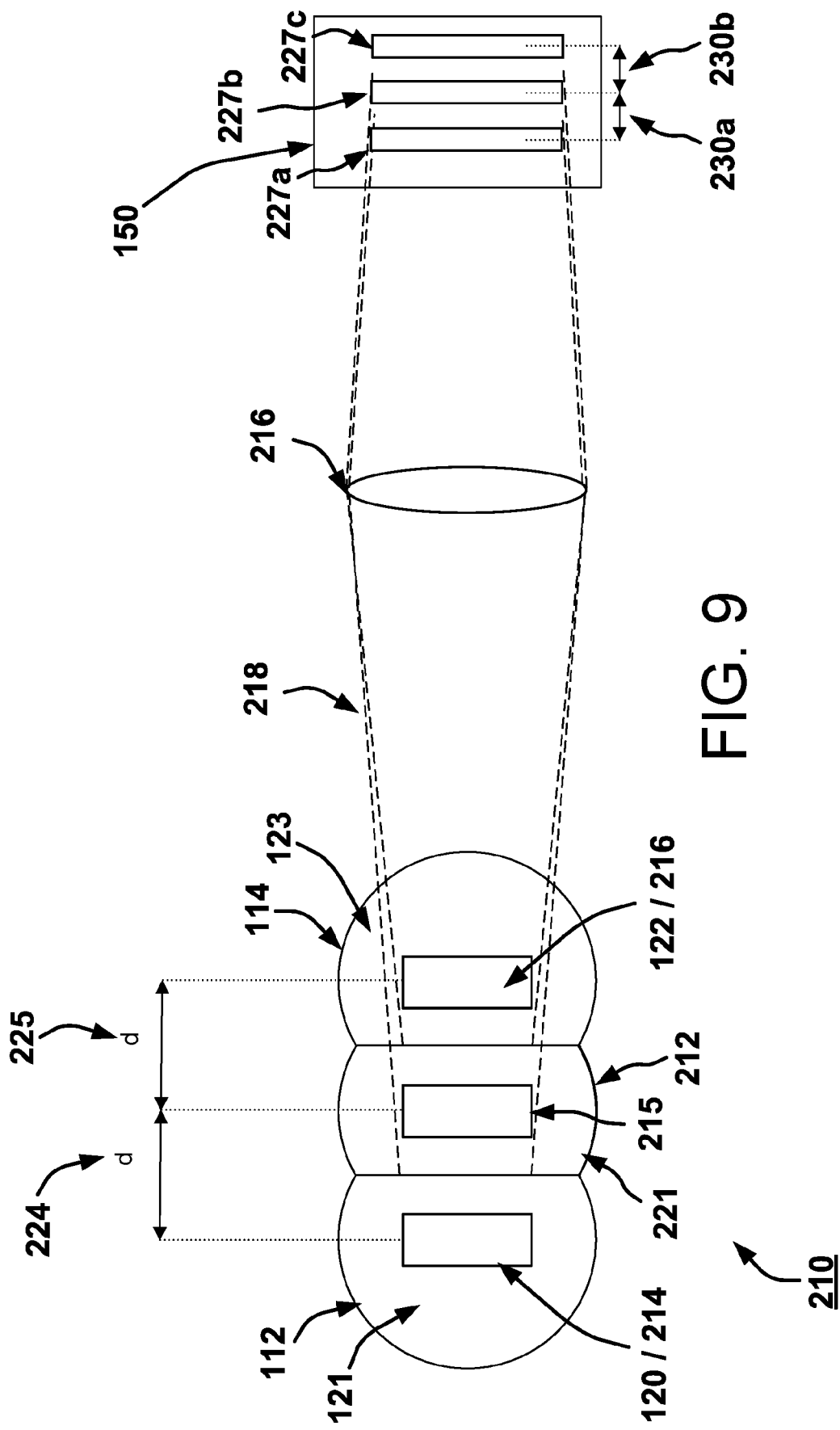
FIG. 9 is a schematic diagram of an arrangement of a multi-core fiber with three fiber cores, imaging optics, and the output thereof.

A multiple-core fiber with three or more rectangular cores can be disposed in an arrangement to produce three or more parallel laser line outputs, for example, as shown in FIG. 9, which is described in more detail below. An example of a three-fiber arrangement 210, that is, an arrangement of three modified fibers, each having a rectangular core 214, 215, 216 the fibers being bonded together is shown in FIG. 7A. A three-fiber arrangement 210 may be produced by fabricating a middle fiber 212 that has two flat surfaces 213a, 213b that allows the fiber to be placed in between two D-shaped fibers, as shown in FIG. 7B. During the fabrication of the middle fiber 212 caution must be taken when removing cladding from the fiber so as not to damage or expose the core 215.

Figure 7C:
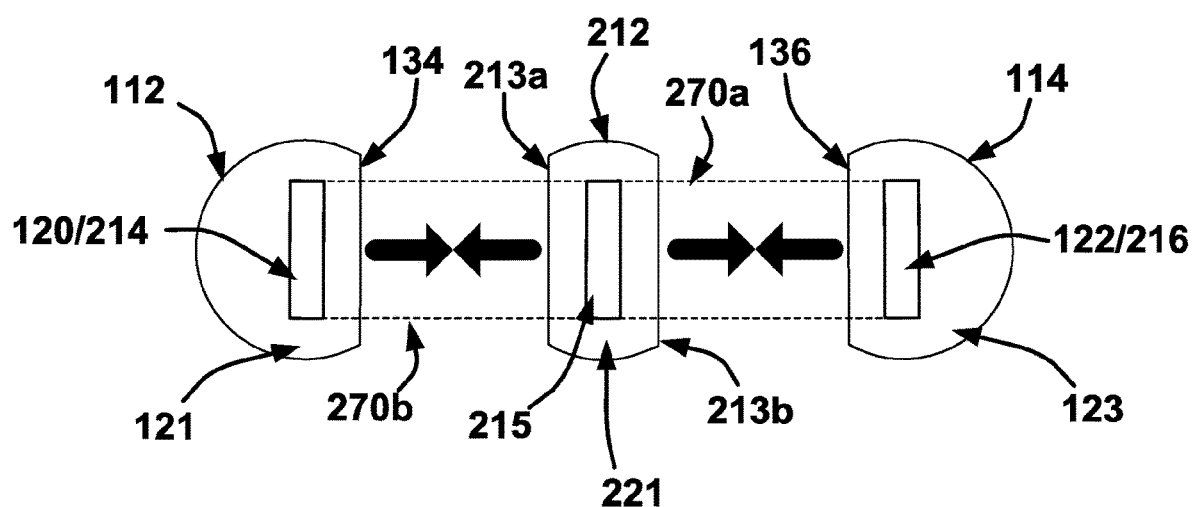

A three-fiber arrangement 210 having three rectangular cores 214, 215, 216 may be made by joining two D-shaped fibers 112, 114 on each side of a middle fiber 212 along the respective flat sides of the fibers. For example, as shown in a cross-sectional view of FIG. 7C, a D-shaped fiber 112, having a flat side 134 is joined to a middle fiber 212, along the middle fiber's first flat side 213a. A second D-shaped fiber 114, having a flat side 135 is joined to the middle fiber 212, along the middle fiber's second flat side 213b. The D-shaped fibers 112, 114 have rectangular shaped cores 120/214, 122/216, and cladding 121, 123 surrounds the cores. The middle fiber 212 also has a rectangular core 215 that is surrounded by cladding 221. In the process of joining a first D-shaped fiber 112 to a middle fiber 212 and joining a second D-shaped fiber 114, to the opposing flat side of the middle fiber 212, it is preferred that the the cores 120/214, 215, 122/216 be aligned and squared in relation to each other, as shown and provided by dashed lines 270a, 270b. By aligning and squaring the cores to each other, and ensuring that the cores run parallel to each, a benefit may be that the laser line outputs 227a, 227b, 227c, or multi-line illuminations, are propagated in a substantially parallel lines to each other, as shown in FIG. 9.

A middle fiber 212 may be formed by removing cladding from a D-shaped fiber. To facilitate the removal of cladding, one or more D-shaped fibers 112, 114 are affixed and secured to a fiber fixture 160, with their flat sides 134, 135 facing down and in substantial contact with the fiber fixture 160. The D-shaped fibers 112, 114 are secured in place on the fiber fixture 160 with wax or non-permanent epoxy 162. The wax or non-permanent epoxy 162 may be placed around the lower half or two-thirds of the D-shaped fibers 112, 114 and used to securely affix the properly aligned D-shaped fibers 112, 114 to the fiber fixture 160. Once, the wax or non-permanent epoxy 162 has sufficiently cured and/hardened, a portion of the circular/round cladding on the exposed and uncovered upper half of the D-shaped fibers 112, 114 can be removed from. The cladding 121, 123 may be removed by one or more of several processes, including but not limited to, grinding, polishing, and/or etching.

Figure 6A:
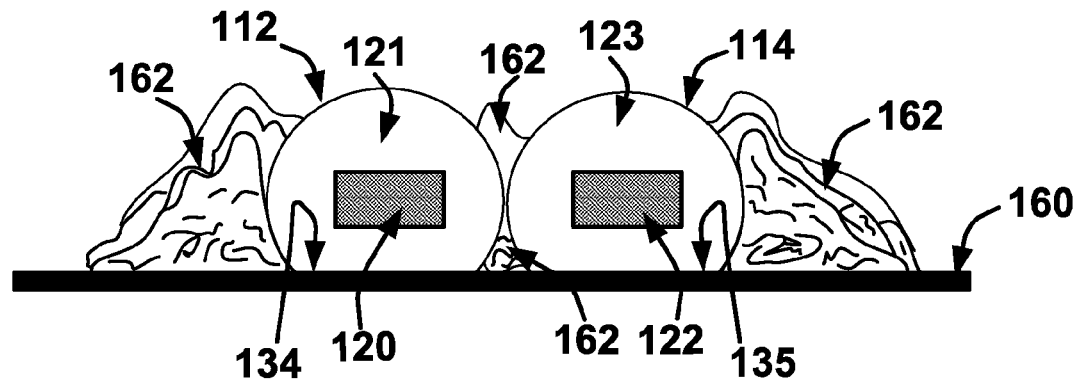
FIGS. 6A, 6B, and 6C, provide cross-sectional diagrams of two single core fibers affixed to a fixture demonstrating additional removal of cladding.
Figure 6B:
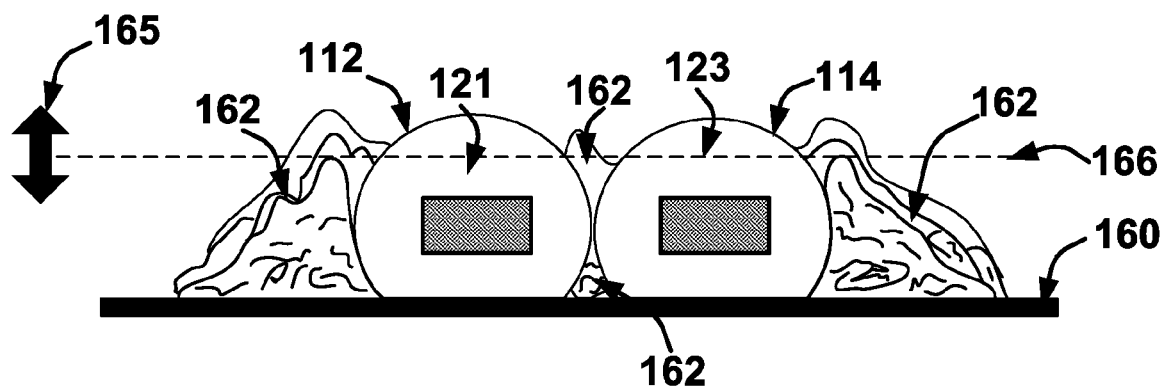

Dashed line 166 in FIG. 6B demonstrates the desired thickness of the cladding 121, 123 that will be removed from the D-shaped fibers 121, 123 through the grinding, polishing, and/or etching process(es). Double-headed arrow 165 is included to show that the dashed line may be moved up or down as may be desired for different applications, as this will control the amount of cladding removed, or that remains and thus control the distance between cores of the fiber in the three-fiber arrangement.

Figure 6C:
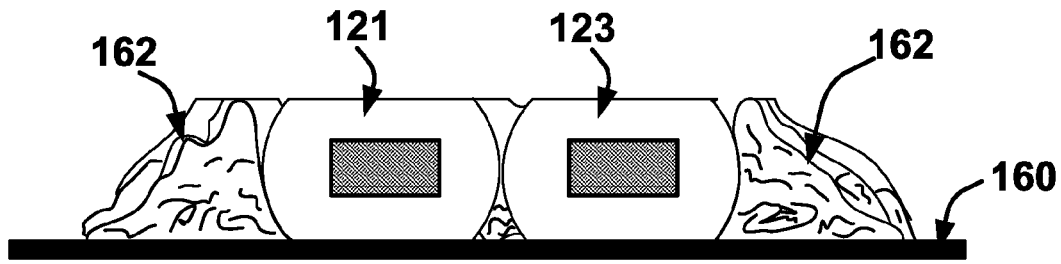

FIG. 6C shows a cross-sectional view of the fibers after a portion has been removed through the grinding, polishing, and/or etching process(es). This process has been used to modify and shape a D-shaped fiber 112, 114 as provided in FIG. 6A, into a fiber with two flat sides, also referred to as a middle fiber 212.

Figure 8A:
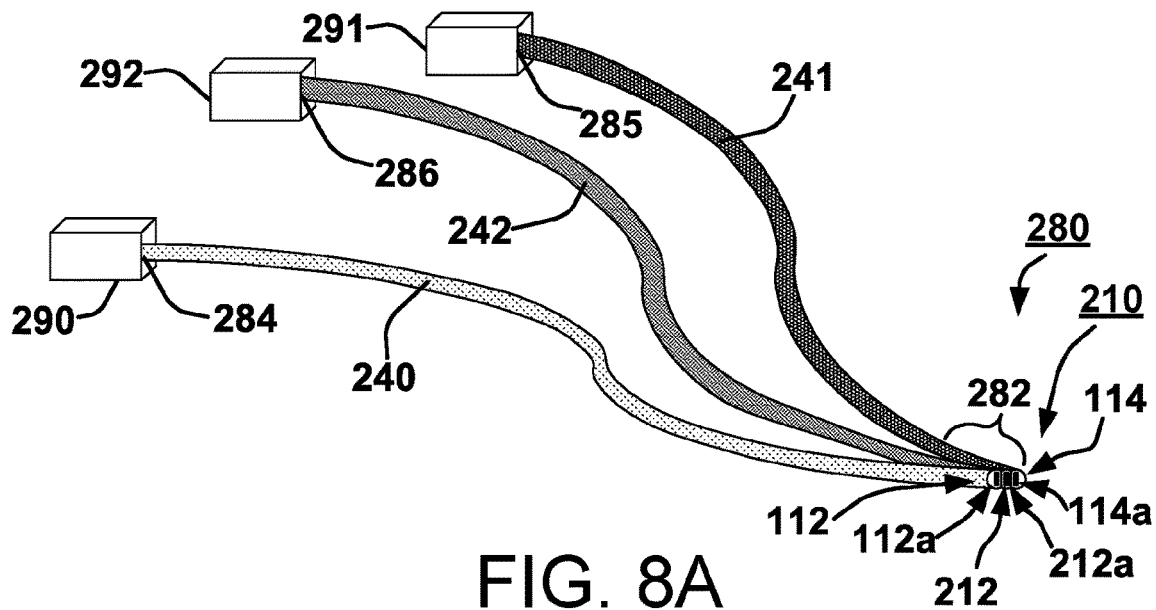
FIGS. 8A and 8B provide schematic diagrams of an arrangement of fibers hereof.
Figure 8B:
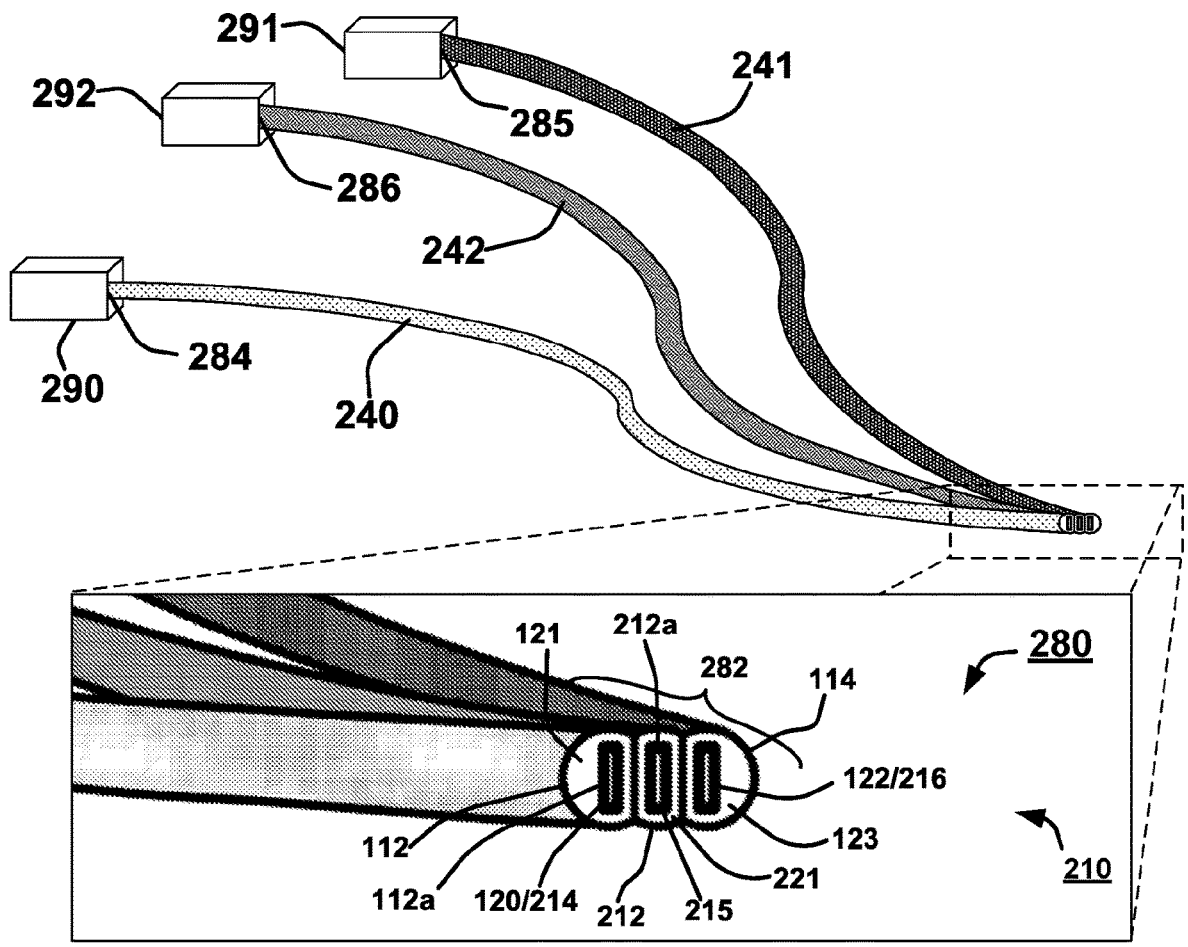

FIGS. 8A and 8B provide a schematic diagram of a finished fiber that has a three-fiber joined end 280 that forms the three-fiber multi-core arrangement 210. The overall length of the fibers 240, 241, 242 may range from about 30 mm to about 10 m or more. The length of joined section 282 may range from about 10 mm to about 300 mm depending on the specifications that may implemented for a particular application. FIG. 8A also provides light source(s) 290, 291, 292 that are cooperatively connected to the input ends 284, 285, 286. FIG. 8A also demonstrates how the fibers 240, 241, 242 are joined at the joined end 280, where the D-shaped fibers 112, 114, surround the middle fiber 212 to form an arrangement 210, that are also the output ends 112a, 114a, 212a of the cores. FIG. 8B provides an enlarged version of the joined end 280 and shows the arrangement of fibers 210 that includes two D-shaped fibers 112, 114 that sandwich the middle fiber 212 along each of the respective flat sides. Additionally, FIG. 8B shows how the rectangular shaped cores 120/214, 215, 122/216 are surrounded by cladding 121, 221, 123 to form the arrangement of fibers 210 that is capable of being connected to a laser light source 290, 291, 292 at the input ends 284, 285, 286. Thus, the fibers 240, 241, 242 are cooperatively connected to the light sources 290, 291, 292 at their respective input ends 284, 285, 286 and are joined at their respective output ends 112a, 114a, 212a. The output ends 112a, 114a, 212a may be coupled with imaging optics to produce the desired laser line outputs for specific applications.

In one aspect, an arrangement of three fibers 210 hereof may include arranging and aligning three optical fibers, two D-shaped fibers 112, 114 and one middle fiber 212, and providing imaging optics 216 after the fibers to provide an output 218, as shown in FIG. 9. Fiber 112 has a core 120/214 surrounded by cladding 121; and fiber 114 has a core 122/216 surrounded by cladding 123. The core 215 of the middle fiber 212 is surrounded by cladding 221. The center of core 120/214 is separated from the center of the core 215 of the middle fiber 212 by the distance 224 ($d$). The center of core 122/216 is likewise separated from the center of the core 215 of the middle fiber 212 by the distance 225 ($d$). In many implementations the distance 224 and distance 225 will be the same lengths; however, they may in certain implementations be different distances. The claddings 121, 123 and 221 between the three rectangular cores 120/214, 215, 122/216 ensure that less than 5% of the light sent through the cores 120/214, 215, 122/216 is lost to leakage.

Providing and configuring imaging optics 216 for use with the three-fiber arrangement 210 may provide for the closely packed multi-core fiber arrangement 210 to produce multi lines 227a, 227b, 227c with uniformity and high aspect ratios, on an image plane 150. The multi lines 227a, 227b, 227c can be multi line of light or of illumination or of other electromagnetic spectrum distinction, or may be in some implementations be multi laser lines 227a, 227b, 227c. In some implementations the imaging optics 216 can be used to form uniform laser lines 227a, 227b, 227c that have aspect ratios of 1:3, 1:4, 1:5, 1:6, 1:7, 1:8, 1:9, 1:10, and in some instances greater than 1:10. The aspect ratios is not to be limited to integers, as the aspect ratio may be any two numbers, including decimals and/or fractional numbers, that may be a useful in a particular application. The preferred, desired, and/or appropriate aspect ratio for a particular application may depend on a number of factors. The imaging optics 216 may be changed, modified, adjusted, and/or tuned to achieve the desired line shapes and aspect ratios. The imaging optics may include one or more lenses and one or more mirrors.

The line spacings 230a, 230b, that is the distance or spacing between laser line 227a and 227b and laser line 227b and 227c may also be modified and tuned for a specific application, as the specifications and preferences may be different between different applications. Again, the preferred, desired, and/or appropriate line spacings 230a, 230b for a particular application may depend on several factors.

Thus, one aspect of the current developments is the ability to change or modify the distance of the center-to-center spacing between laser line 227a and laser line 227b and laser line 227c, and the developments hereof provide for the line spacings 230a, 230b to be as narrow as or less than a distance d of about a single line diameter, or about 50 µm from the center of laser line 227a to the center of laser line 227b (or from the center of laser line 227b to the center of laser line 227c), or may be a multiple of something larger than a single diameter, to as wide as about 300 µm from the center of laser line 227a to the center of laser line 227b (or from the center of laser line 227b to the center of laser line 227c).

Figure 10:
FIG. 10 provides an example of a rectangular core of a fiber hereof.

The rectangular core 120, 122, 214, 215, 216 of the fibers described and disclosed herein may have a ratio of Width (W):Length (L), of 1:1 (square), or 1:2, or 1:3, or 1:4, or 1:5, or 1:6, or 1:7, or 1:8, or 1:9, or 1:10, or greater than 1:10, where the W and/or L are not limited to integers or whole numbers. A simple core is provided in FIG. 10. The numerical aperture, or NA, of the core may range from as low as 0.05 to 1.0.

Figure 11:
FIG. 11 provides a diagram of two rectangular cores and the relationship thereof.
Figure 11:

In accordance with another aspect of the developments hereof, the image of the fiber output end can be re-imaged to the desired image plane by configuring and using the appropriate imaging optics. Thus, the W (width) and L (length) may be independently transformed W→rxW and L→ryL, respectively. The rx and ry factors may be either expansion or reduction. Thus, the spacing d becomes rxd. For example, using a focusing lens of f=10 mm and placing the tip of the fiber arrangement about 20 mm away from the lens produces a one-to-one image at about 20 mm on the opposite side of the lens. In this case, rx=ry=1. This is shown in FIG. 11.

For example, the following imaging formula may be implemented:

$$1/f=1/p+1/q$$

where f is the focal length; p is the distance between the lens and the fiber tip; q is the distance between the lens and the image plane. The magnification ratio is r=q/p.

For example, in FIG. 2, the distance between the lens and the fiber tip, p, is represented by dashed line 198, the distance between the lens and the image plane, q, is represented by dashed line 199.

Cylindrical lenses in x and in y respectively may be used to make different imaging ratios of rx and ry.

The imaging optics may in some implementations have a magnification factor. In other implementations the imaging optics may have additional elements to reduce optical distortion. In yet another implementation, the imaging optics may be capable of independently transforming the width and length of the multi-line illumination, laser lights, and/or light lines, on an image plane.

Figure 12A:
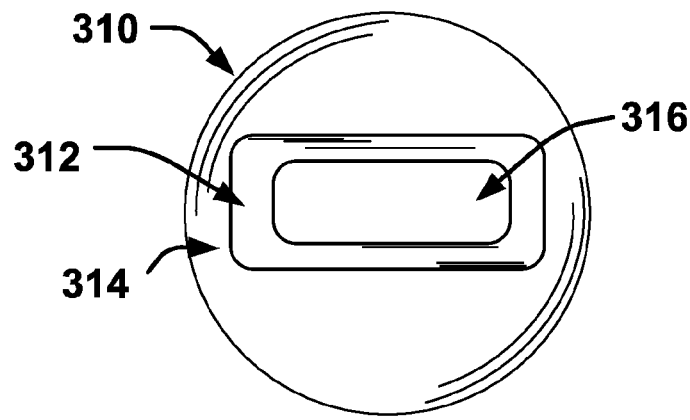
FIGS. 12A, 12B, and 12C provide a cross-sectional diagram of a double-clad fiber prior to and after removing cladding.
Figure 12B:
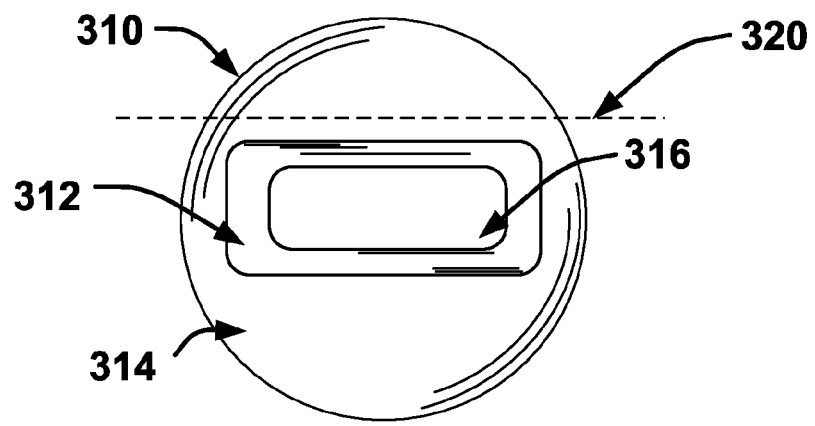
Figure 12C:
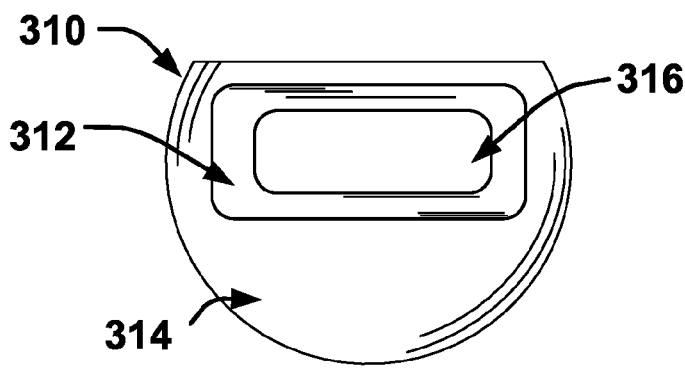

It should be noted that the cladding material 121, 123 of FIG. 2, inter alia, and cladding 221 of FIG. 7, inter alia, may be more than about 10 µm in thickness to ensure less than about 5% of light leakage out of the cores. Furthermore, the multi-fiber structures and arrangements described and disclosed herein, may be formed by using a multi-cladding fiber, as well. For example, FIGS. 12A, 12B, and 12C show a double-clad rectangular core fiber, and how such a fiber might be modified to be included in a multi-fiber arrangement. In FIG. 12A, the double-clad fiber 310, has a rectangular core 316, that is surrounded by a first cladding 312, or inner cladding, which is surrounded and encompassed by a second cladding 314, or outer cladding. FIG. 12B demonstrates that the double clad fiber 310 may be modified at the location of the dashed line 320, which demonstrates the desired thickness of the cladding 314 that will be removed through a grinding, polishing, and/or etching process(es). It should be appreciated that the dashed line 320 may be higher or lower on the double-clad fiber 310 and in some instances a portion of the inner cladding 312 may be removed if the desired distance between cores so requires. FIG. 12C demonstrates what a double-clad fiber 310 may resemble after a portion of the outer cladding 314 that is above the dashed line 320 in FIG. 12B, is removed. The result of removing a portion of the outer clad 314 is a D-shaped fiber, that may be used to form two, three, four or more core, fiber arrangements that are disclosed and described herein.

The light sources 190, 191 of FIGS. 5A and 5B, and light sources 290, 291, 292 of FIGS. 8A and 8B to be coupled into the input ends 184, 185, 284, 285, 286 of the fibers may be from a laser light source such as single emitter diode lasers, multi-emitter diode laser bars, multi-stack diode laser arrays, multi-emitter vertical cavity semiconductor lasers (VCSEL), multi-emitter vertical external cavity semiconductor lasers (VECSEL), solid state lasers, fiber lasers, fiber delivered laser, or any combination of lasers.

It should be appreciated, that the light sources 190, 191 of FIGS. 5A and 5B, and light sources 290, 291, 292 of FIGS. 8A and 8B to be coupled into the input ends of the fibers is not limited to lasers. Non-coherent light sources such as light emitting diodes (LEDs), superluminescent LEDs, or gas discharged lamps can be combined and coupled into the fibers. The desired illumination lines can be produced from these light sources as well.

In some implementations, different wavelengths of lasers/LEDs/lamps can also be combined and coupled into the same fiber core to deliver different wavelengths of light to the same location. In some implementations a combination of different light sources may be utilized simultaneously in a core, in other implementations a combination of different light sources may be utilized sequentially in a core.

Figure 13A:
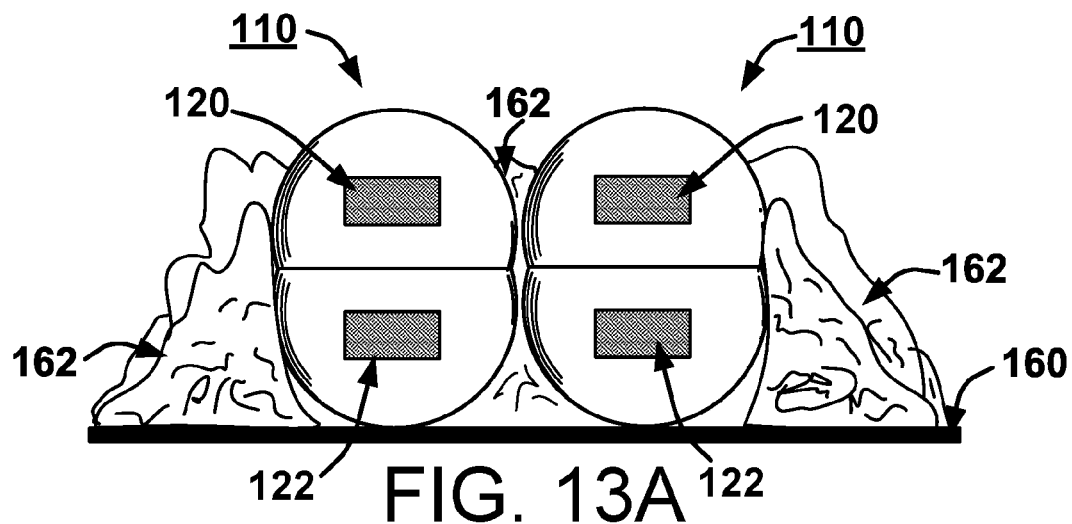
FIGS. 13A, 13B, 13C, 13D, and 13E provide cross-sectional diagrams of two dual core fibers affixed to a fixture demonstrating additional removal of cladding and forming an inline four core fiber.
Figure 13B:
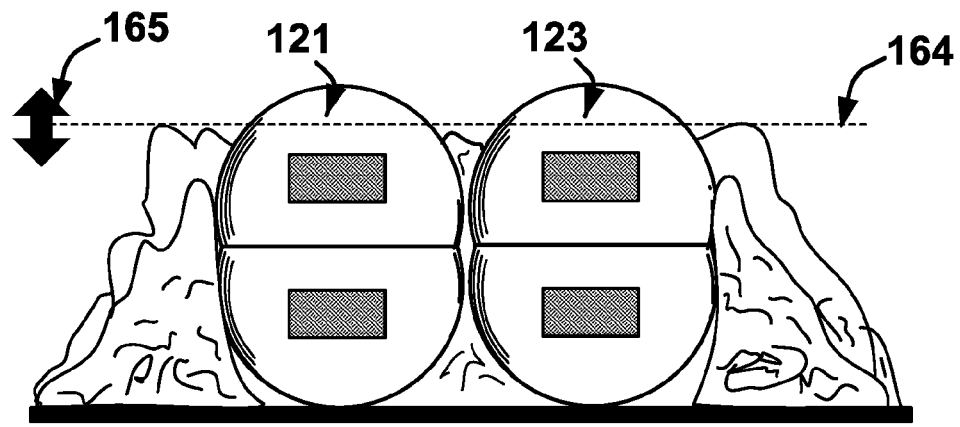
Figure 13C:
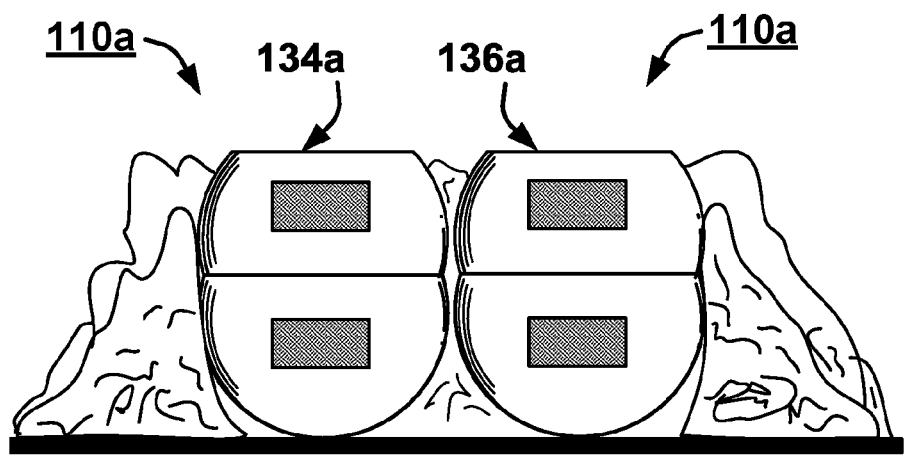

FIGS. 13A, 13B and 13C provide yet another alternative method for modifying fiber, specifically showing how an arrangement of fibers 110 may be modified. The two dual-core fibers are then joined in FIG. 13D to create yet another implementation of an arrangement of fibers, a four core linearly arrangement of the cores as shown in FIG. 13E.

For example, in FIG. 13A, two dual core arrangements of fibers 110 are placed on a fiber fixture 160. The cores 120, 122 are arranged and aligned so that the longer side of the core runs parallel with the fixture. The fibers are secured in place on the fiber fixture 160 with wax or non-permanent epoxy 162. The wax or non-permanent epoxy 162 may be placed around the fibers to secure the fibers in place while they are being modified as in FIG. 13B. Next, a portion of the cladding is removed from the exposed and accessible portion of the fiber. Dashed line 164 demonstrates the desired thickness of the cladding 121, 123 that will be removed through the grinding, polishing, or etching process(es). Double-headed arrow 165 is included to show that the dashed line may be moved up or down as may be desired for different applications, as this will control the amount of cladding removed, or that remains and thus control the distance between cores of the fiber in the final arrangement. FIG. 13C demonstrates the shape that results after a portion of the cladding is removed from the fibers, resulting in two dual core fibers 110a. These two dual core fibers 110a have respective flat or flattened sides 134a, 136a.

Figure 13D:
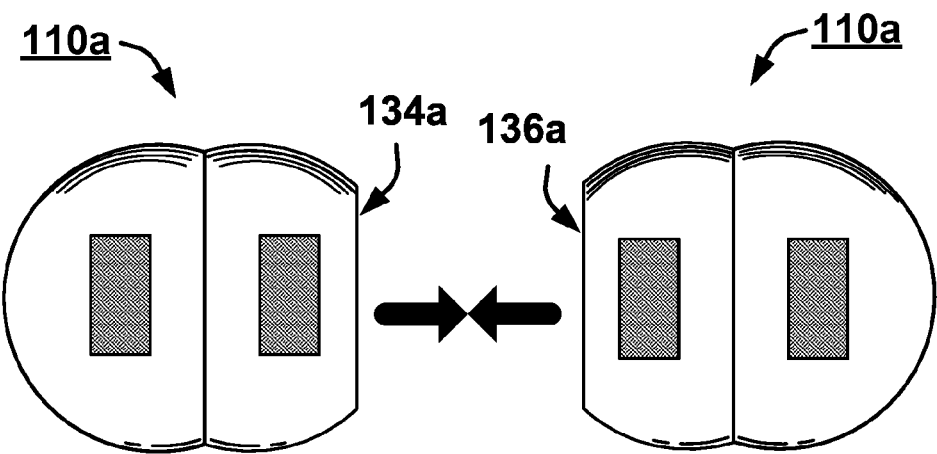
Figure 13E:
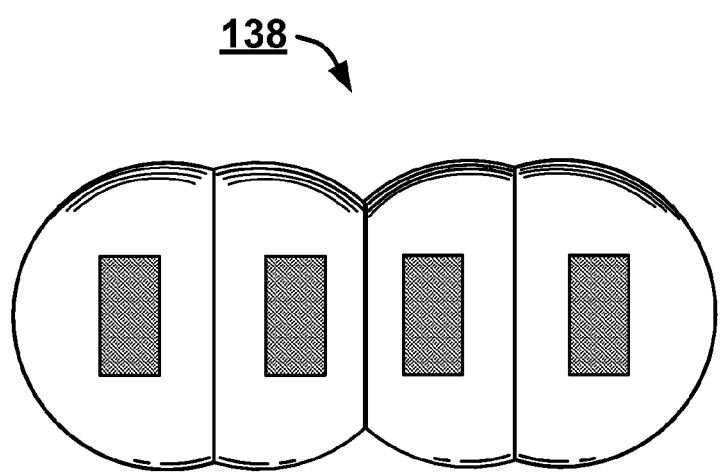

The two modified dual core fibers 110a are joined along their flat or flattened sides 134a, 136a as shown in FIG. 13D. The resulting four core fiber arrangement 138 is shown in FIG. 13E.

Figure 14A:
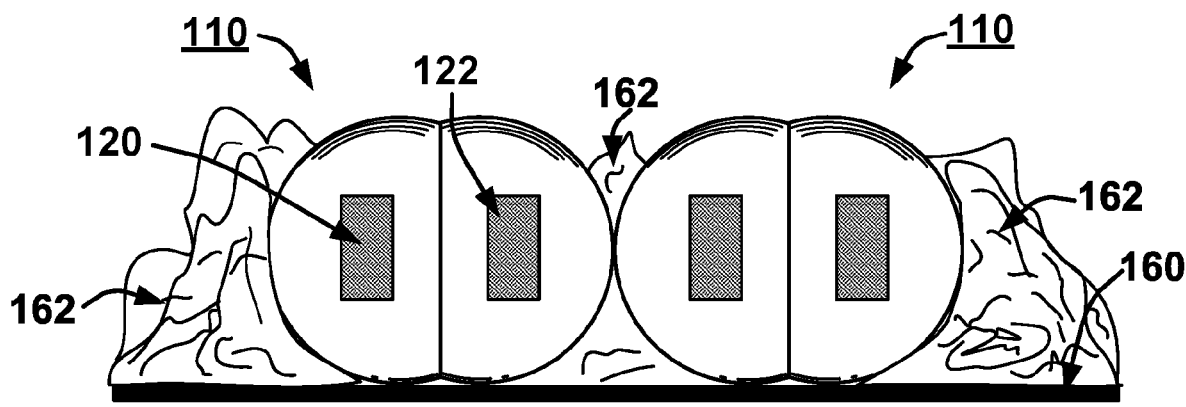
FIGS. 14A, 14B, 14C, 14D, and 14E, provide cross-sectional diagrams of two dual core fibers affixed to a fixture demonstrating additional removal of cladding and forming a four-core fiber arranged in a rectangle.
Figure 14B:
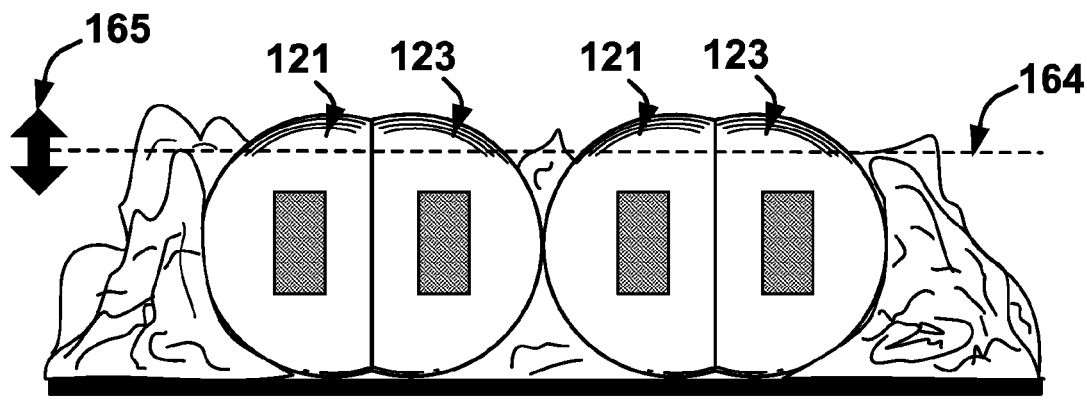
Figure 14C:
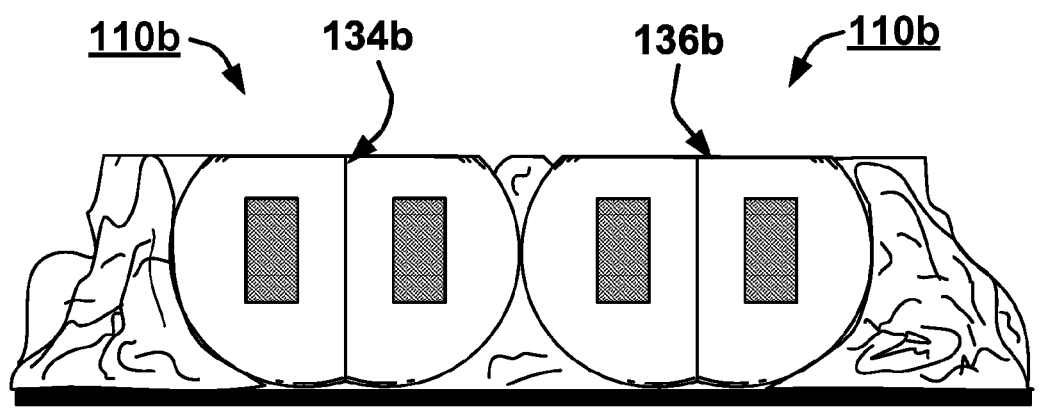

FIGS. 14A, 14B, and 14C provide yet another alternative method for modifying fiber, specifically showing how an arrangement of fibers 110 may be modified. The resulting two dual core fibers 110b are then joined in FIG. 14D to create yet another implementation of an arrangement of fibers 139, a four core, rectangular arrangement of cores as shown in FIG. 14E.

For example, in FIG. 14A, two dual core arrangement of fibers 110 are placed on a fiber fixture 160. Note that the cores 120, 122 are arranged and aligned so that the shorter side of the core runs parallel with the fixture. The fibers are secured in place on the fiber fixture 160 with wax or non-permanent epoxy 162. A portion of the cladding 121, 123 is removed from the exposed and accessible portion of the fiber. Dashed line 164 demonstrates the desired thickness of the cladding 121, 123 that will be removed through the grinding, polishing, or etching process(es). Double headed arrow 165 is included to show that the dashed line may be moved up or down as may be desired for different applications, as this will control the amount of cladding removed, or that remains and thus control the distance between cores of the fiber in the final arrangement. FIG. 14C demonstrates the shape that results after a portion of the cladding is removed from the fibers, resulting in two dual core fibers 110b. These two dual core fibers 110b have respective flat or flattened sides 134b, 136b.

Figure 14D:
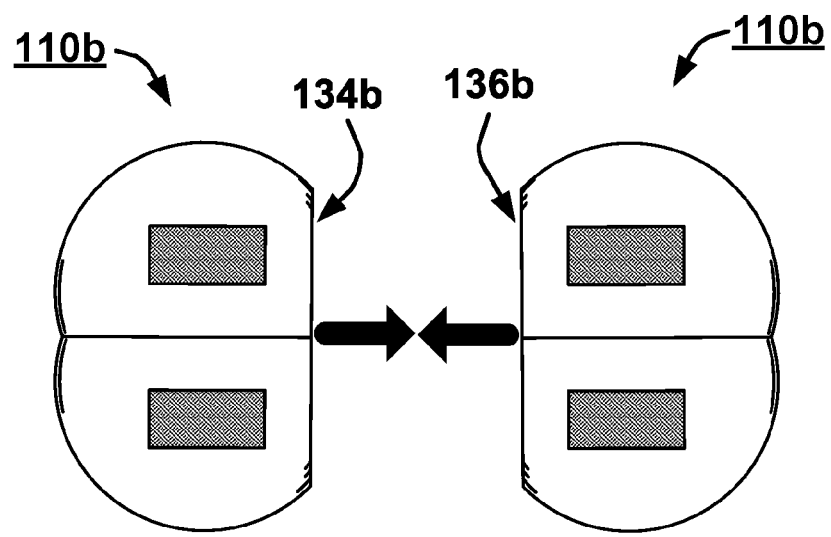
Figure 14E:
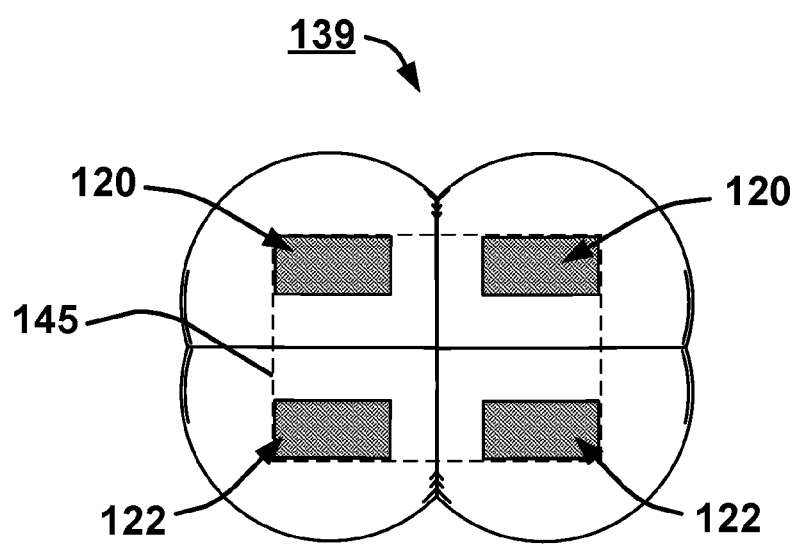

The two modified dual core fibers 110b are joined along their flat or flattened sides 134b, 136b as shown in FIG. 14D. The resulting four core fiber arrangement 139 is shown in FIG. 14E. Dashed line 145 demonstrates how the cores 120,122 occupy the four corners of the rectangle created by dashed line 145.

Figure 15B:
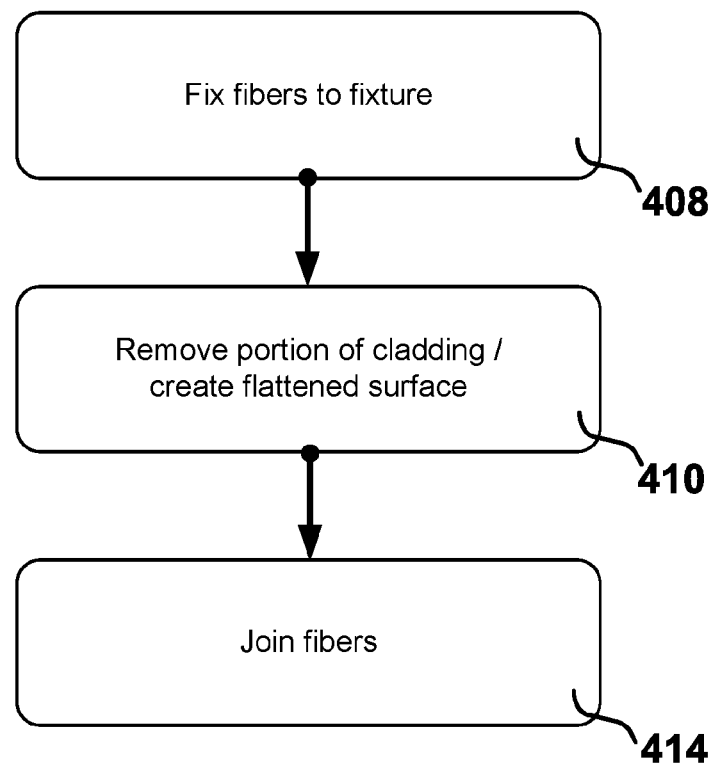

FIG. 15B provides a flow chart showing an exemplar method for forming a fibers including fixing fibers to a fixture 408, removing a portion of cladding and/or creating a flattened surface 410, and joining the modified fibers together 414. Note, the first two operations 408, 409 could be conflated such that a two-part operation results, as shown in FIG. 15A: first forming or shaping one or more of a plurality of fibers 407, and second joining two or more of a plurality of fibers 414 (the plurality being two or more fibers). The forming operation could involve pre-forming in a pre-manufacturing sense such that a fiber is extruded or otherwise formed in a shape with a reduced side for the joining; or, the forming/shaping operation could be post initial manufacture side reduction or flattening—material removal may not be necessary in some implementations—of some cladding or other external material for the joining operation. Again, only one of two or more fibers need be formed, though often two or more fibers will be preferably formed or shaped or flattened for the later joining. The resulting multi-core fiber will have or present cores that are disposed closer to each other less than a diameter of a single one or the plurality of fibers in the multi-core arrangement.

Figure 15C:
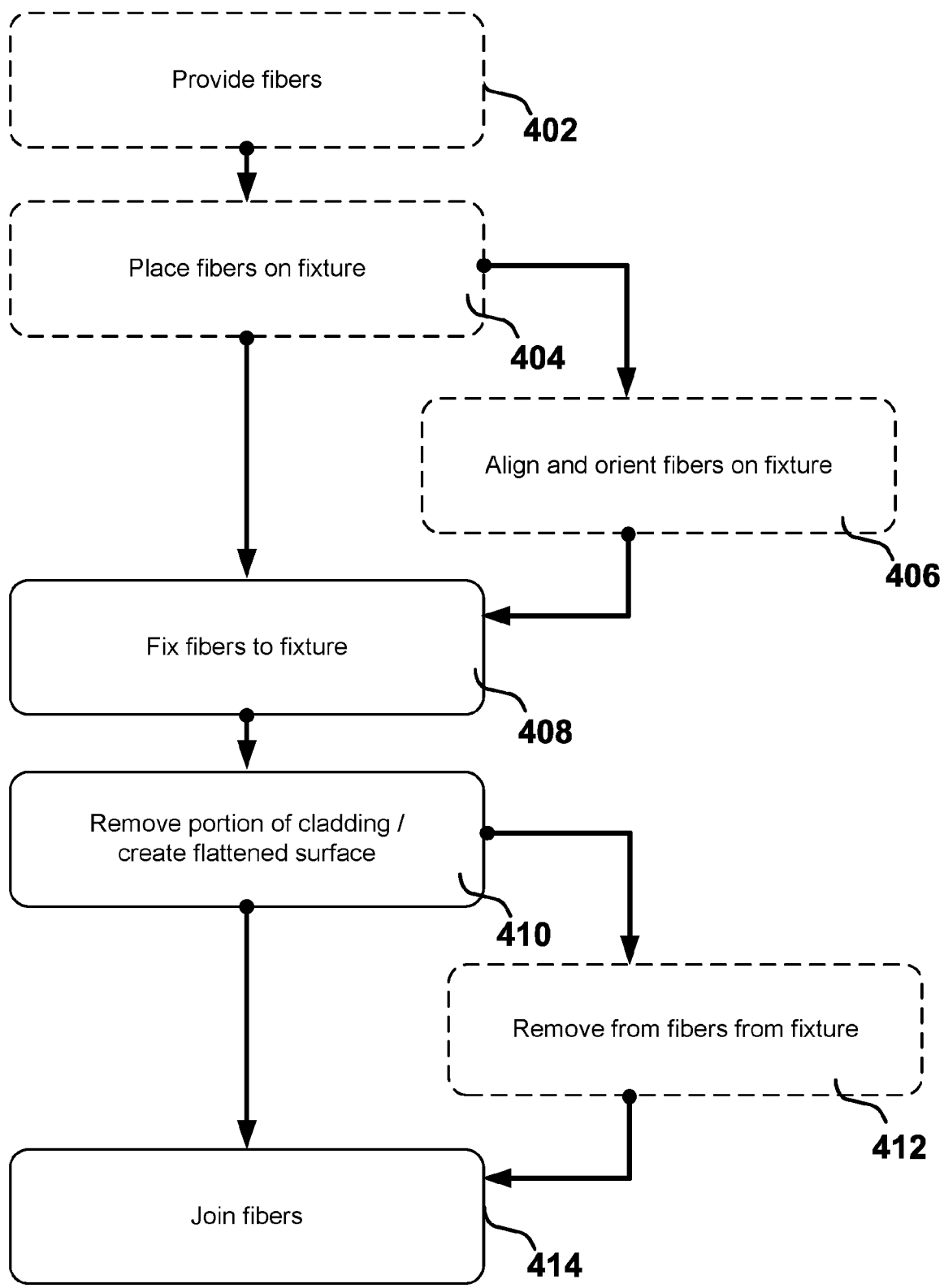

In another non-limiting exemplar, FIG. 15C provides a flow chart showing a discrete method for forming a two-core fiber. Initially, a first and second fiber, each having a core, are provided 402. Next, the first and second fiber are placed on a fiber fixture 404. Then the first and second fibers are aligned and oriented on the fiber fixture 406. Once the fibers are properly aligned and oriented, support regions are filled with a fixing agent such as wax or non-permanent epoxy, that secures the fibers to the fixture 408. Next, a portion of the top side of the first and second fiber is removed or otherwise flattened through one or more of grinding, polishing, etching and/or flattening 410 to create fibers that have flattened joining surfaces/areas. Then modified and/or altered fibers are removed from the fiber fixture 412. The first and second fibers are then aligned and joined at their flattened joining surfaces 414 which results in a two-core fiber.

Figure 16:
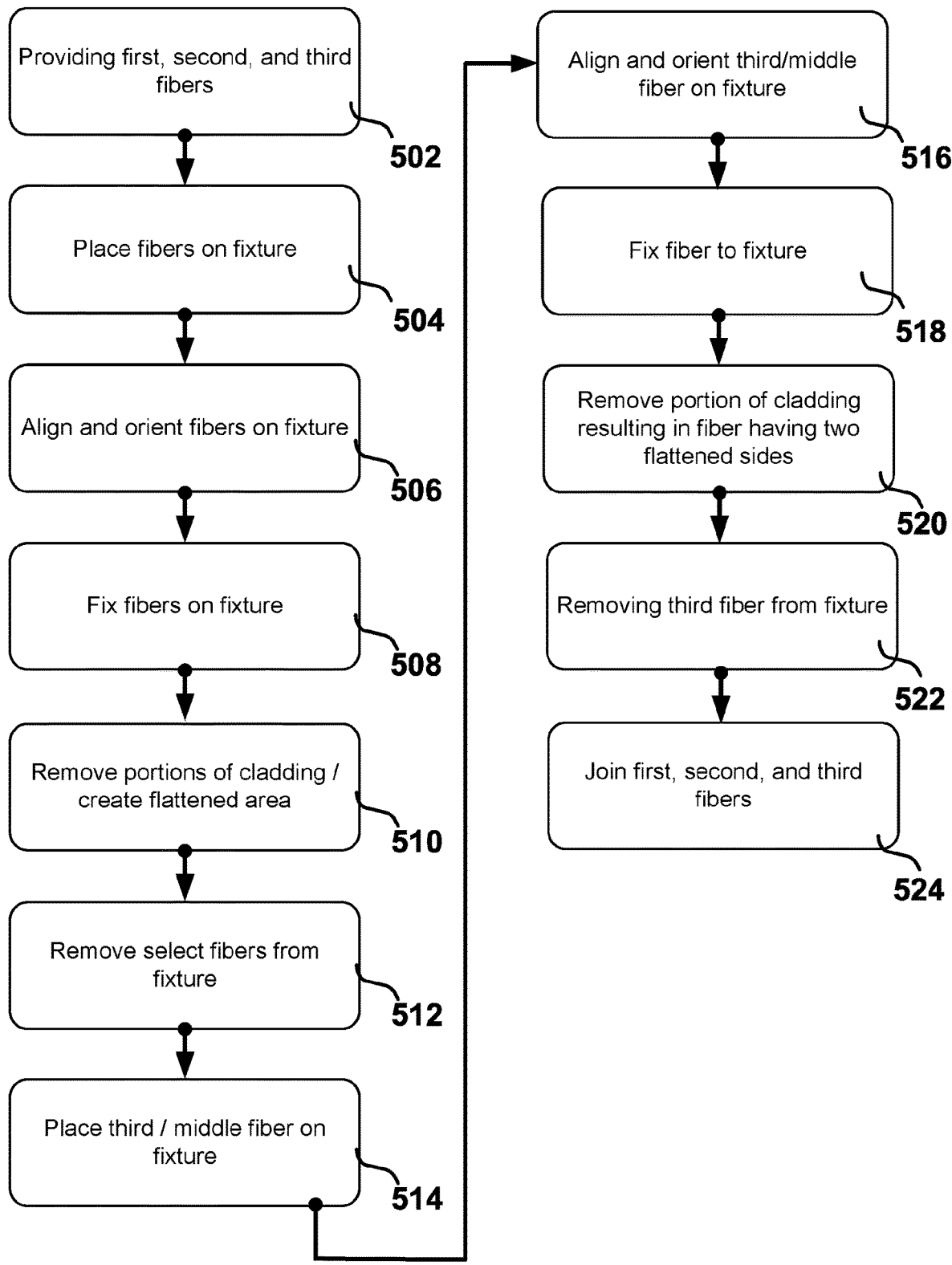
FIG. 16 is a flow chart showing a method for forming a three-core fiber.

FIG. 16 provides a flow chart showing an alternative method for forming a three- or other "n"-core fiber. First, first, second, and third or "n"-fibers are provided 502. Next, the first, second and third or "n" fibers are placed on a fiber fixture 504. Then the three or "n" fibers are aligned and oriented on the fiber fixture 506. This process of aligning and orienting is described in more detail with reference to FIGS. 6A, 6B, and 6C, inter alia. Once the fibers are properly aligned and oriented, support regions are filled with a fixing agent, such as wax or non-permanent epoxy, to secure the fibers to the fixture 508. Next, a portion of the exposed and accessible top side of the first, second and third or "n" fibers is removed through one or more of grinding, polishing, etching and/or flattening 510 to create fibers that have flattened joining surfaces/areas. Next, the fibers are removed from the fiber fixture 512. Then, one of the fibers, in this instance the third fiber is again placed on a fiber fixture or plate; however, the third fiber is placed with its flat side down and against the fiber fixture or plate 514. Next, the third fiber is aligned and oriented on the fiber fixture 516. Then, support regions are filled with a fixing agent, such as wax or non-permanent epoxy, to secure the fibers to the fixture 518. Next, a portion of the exposed, accessible, and previously unmodified side of the fiber is removed through one or more of grinding, polishing, and/or etching 520, which results in the fiber having two flat sides. This third or "n" fibers with two flat sides is then removed from the fiber fixture 522 and is capable of being used as a middle fiber in an arrangement. Lastly, the first, second, and third or "n" fibers are arranged and aligned, such that the middle fiber is located and positioned between the first and second fibers, along each of their respective flattened joining surfaces 524, which is shown and described in FIGS. 7A, 7B, and 7C, inter alia. By this or like methods, four or more core fibers can be used/produced as well.

The above discussion is illustrative of the principles and various implementations of the present developments. Numerous variations, ramifications, and modifications of the basic concept which have not been described may become apparent to those skilled in the art once the above disclosure is fully appreciated. Therefore, the above description should not be taken as limiting the scope of the inventions, which is defined by the appended claims.

What is claimed is:

1. A multi-core fiber having a plurality of optical, light-light conducting cores within an arrangement of two or more fibers comprising:
   first and second fibers, each of the first and second fibers having a rectangular, square, or polygon cross-sectional optical, light-light conducting core, the cross-sectional optical, light-light conducting cores being separated by a distance that is less than a cross-sectional unmodified fiber diameter,
   wherein an orientation of the rectangular, square, or polygon cross-sectional optical, light-light conducting core of the first fiber and an orientation of the rectangular, square, or polygon cross-sectional optical, light-light conducting core of the second fiber are aligned upon joining the first fiber to the second fiber to provide a multi-line light including substantially uniform lines of light and substantially stable spacing therebetween.

2. A multi-core fiber having a plurality of optical, light-light conducting cores within an arrangement of two or more fibers according to claim 1 the two or more fibers being three or more or n fibers, each fiber having a rectangular, square, or polygon cross-sectional optical, light-light conducting core, the cross-sectional optical, light-light conducting cores being separated by a distance that is less than an unmodified fiber diameter.

3. A multi-core fiber according to claim 1 made by:
   forming one or more or n fibers for joining;
   joining two or more fibers to form a multi-core fiber having a optical, light-light conducting core separation of less than a cross-sectional diameter of a fiber.

4. A multi-core fiber according to claim 3, the forming one or more or n fibers including one or both of flattening and reducing outer fiber material.

5. A multi-core fiber according to claim 3, the forming one or more or n fibers including fixing one or more fibers to a fixture and reducing outer fiber material of the one or more fibers fixed to a fixture.

6. A multi-core fiber according to claim 3, further including
   providing a first single core fiber having a top side and a bottom side;
   providing a second single core fiber having a top side and a bottom side;
   providing a fiber fixture;
   placing the bottom side of the first single core fiber on a fiber fixture,
   placing the bottom side of the second single core fiber on a fiber fixture,
   aligning the orientation of the first fiber optical, light-light conducting core and the second fiber optical, light-light conducting core,
   filling one or more support regions with a fixing agent,
   removing a portion of the top sides from the first and second single core fibers resulting in the first fiber and the second fibers having a flat top side area;
   aligning and permanently joining the first fiber and second fiber at the flat top side areas.

7. A multi-core fiber according to claim 1 comprising:
   the first fiber optical, light-light conducting core being surrounded by one or more layers of cladding;
   the second fiber optical, light-light conducting core being surrounded by one or more layers of cladding;
   the first and second fibers having a substantially polygon cross-sectional optical, light-light conducting core, the center-to-center distance of the optical, light-light conducting cores being separated by a distance that is less than the diameter of either the first or second unmodified fibers.

8. A multi-core fiber according to claim 1, the optical, light-light conducting cores being arranged in a substantially parallel orientation.

9. A multi core fiber according to claim 1, the fibers being optical fibers.

10. A multi-core fiber according to claim 1, the optical, light-light conducting cores being configured to propagate at least two discrete but substantially parallel lines of illumination.

11. A multi-core fiber according to claim 1, the first fiber having a first fiber input end and the second fiber having a second fiber input end, the first fiber input end and the second fiber input end being configured to receive laser light and/or non-coherent light to propagate lines of illumination.

12. A multi-core fiber according to claim 1 being operatively disposed relative to laser light sources being selected from the list comprising: single emitter diode lasers, multi-emitter diode laser bars, multi-stack diode laser arrays; multi-emitter vertical cavity semiconductor lasers (VCSELs), multi-emitter vertical external cavity semiconductor lasers (VECSELs), solid state lasers, fiber lasers, fiber delivered lasers, and/or a combination of lasers.

13. A multi-core fiber of claim 12: the laser light being different wavelengths or colors.

14. A multi-core fiber of claim 13: the different laser wavelengths or colors being combined and/or coupled into the same fiber core to deliver different laser wavelengths to the same location.

15. A multi-core fiber of claim 14: the different laser wavelengths or colors being delivered either simultaneously or sequentially to the same location.

16. A multi-core fiber according to claim 1 a non-coherent light source being operatively disposed relative thereto, the non-coherent light source being selected from the list comprising: one or more light emitting diodes (LEDs), one or more super luminescent LEDs, and/or one or more gas discharged lamps.

17. A multi-core fiber of claim 16: the non-coherent light source being different wavelengths or colors.

18. A multi-core fiber of claim 17: the different non-coherent light wavelengths or colors being combined and/or coupled into the same fiber core to deliver different laser wavelengths to the same location.

19. A multi-core fiber of claim 18: the different non-coherent light being delivered either simultaneously or sequentially to the same location.

20. A multi-core fiber according to claim 1 the optical, light-light conducting cores having a numerical aperture (NA) ranging from 0.05 to 1.0.

* * * * *